(12) United States Patent
Madhavarapu et al.

(10) Patent No.: US 9,501,501 B2
(45) Date of Patent: Nov. 22, 2016

(54) LOG RECORD MANAGEMENT

(71) Applicant: Amazon Technologies, Inc., Reno, NV (US)

(72) Inventors: Pradeep Jnana Madhavarapu, Mountain View, CA (US); Neal Fachan, Seattle, WA (US); Anurag Windlass Gupta, Atherton, CA (US); Samuel James McKelvie, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 131 days.

(21) Appl. No.: 14/201,509

(22) Filed: Mar. 7, 2014

(65) Prior Publication Data

US 2014/0279920 A1  Sep. 18, 2014

Related U.S. Application Data

(60) Provisional application No. 61/794,612, filed on Mar. 15, 2013.

(51) Int. Cl.
*G06F 17/00* (2006.01)
*G06F 17/30* (2006.01)

(52) U.S. Cl.
CPC ... *G06F 17/30283* (2013.01); *G06F 17/30289* (2013.01)

(58) Field of Classification Search
CPC .............. G06F 11/1076; G06F 11/1464; G06F 11/1662; G06F 11/2064; G06F 11/2074
See application file for complete search history.

(56) References Cited

U.S. PATENT DOCUMENTS

| | | | |
|---|---|---|---|
| 5,280,612 A | 1/1994 | Lorie et al. | |
| 5,471,614 A | 11/1995 | Kakimoto | |
| 5,524,205 A | 6/1996 | Lomet et al. | |
| 5,530,850 A | 6/1996 | Ford et al. | |
| 5,870,758 A | 2/1999 | Bamford et al. | |
| 5,892,917 A * | 4/1999 | Myerson | G06F 11/3471 709/224 |
| 5,907,848 A | 5/1999 | Zaiken et al. | |
| 6,233,585 B1 | 5/2001 | Gupta et al. | |
| 6,240,413 B1 | 5/2001 | Learmont | |
| 6,615,219 B1 | 9/2003 | Bruso et al. | |
| 6,631,374 B1 | 10/2003 | Klein et al. | |
| 6,732,171 B2 | 5/2004 | Hayden | |
| 6,832,229 B2 | 12/2004 | Reed | |

(Continued)

FOREIGN PATENT DOCUMENTS

EP    0675451    10/1995

OTHER PUBLICATIONS

International Search Report from PCT/US2014/024759, mailed Jul. 14, 2014, Amazon Technologies, Inc., pp. 1-13.
"Amazon Web Services Blog" Downloaded Apr. 30, 2013 from http://aws.typepad.com/aws/2010/10/annazon-rdsannouncing-read-replicas.html, Published Oct. 5, 2010 pp. 1-11.
"Bloom Filter" Downloaded from http://en.wikipedia.org/wiki/Bloom_filter on May 15, 2013, pp. 1-12.

(Continued)

*Primary Examiner* — Truong Vo
(74) *Attorney, Agent, or Firm* — Robert C. Kowert; Meyertons, Hood, Kivlin, Kowert & Goetzel, P.C.

(57) ABSTRACT

A database system may maintain a plurality of log records at a distributed storage system. Each of the plurality of log records may be associated with a respective change to a data page. The plurality of log records may be transformed (e.g., cropped, prune, reduce, fused, deleted, merged, added, etc.).

20 Claims, 10 Drawing Sheets

(56) References Cited

U.S. PATENT DOCUMENTS

| | | | |
|---|---|---|---|
| 6,976,022 | B2 | 12/2005 | Vemuri et al. |
| 7,010,645 | B2 | 3/2006 | Hetzler et al. |
| 7,089,253 | B2 | 8/2006 | Hinshaw et al. |
| 7,146,386 | B2 | 12/2006 | Xiao |
| 7,257,689 | B1 | 8/2007 | Baird |
| 7,305,386 | B2 | 12/2007 | Hinshaw et al. |
| 7,308,456 | B2 | 12/2007 | Friske et al. |
| 7,716,645 | B2 | 5/2010 | Dolby et al. |
| 7,747,663 | B2 | 6/2010 | Atkin et al. |
| 7,885,922 | B2 | 2/2011 | Pareek et al. |
| 7,930,271 | B2 | 4/2011 | Tarbell |
| 7,937,551 | B2 | 5/2011 | Schott |
| 7,979,670 | B2 | 7/2011 | Saliba et al. |
| 8,086,650 | B1 * | 12/2011 | Milford ............ G06F 17/30076 707/804 |
| 8,209,515 | B2 | 6/2012 | Schott |
| 8,255,627 | B2 | 8/2012 | Blinick et al. |
| 8,266,114 | B2 | 9/2012 | Mace et al. |
| 8,271,830 | B2 | 9/2012 | Erofeev |
| 8,289,801 | B2 | 10/2012 | Smith et al. |
| 8,301,670 | B2 | 10/2012 | Revah et al. |
| 8,326,897 | B2 | 12/2012 | Butterworth et al. |
| 8,341,128 | B1 | 12/2012 | Ruggiero |
| 8,370,715 | B2 | 2/2013 | Hafner et al. |
| 8,380,670 | B2 | 2/2013 | Kuber et al. |
| 8,392,479 | B1 | 3/2013 | Pantin |
| 8,396,831 | B2 | 3/2013 | Larson et al. |
| 8,412,689 | B2 | 4/2013 | Reid et al. |
| 8,412,752 | B2 | 4/2013 | Dodge |
| 8,429,121 | B2 | 4/2013 | Pareek et al. |
| 2002/0107835 | A1 | 8/2002 | Coram et al. |
| 2002/0143733 | A1 | 10/2002 | Mukkamalla et al. |
| 2004/0133622 | A1 | 7/2004 | Clubb et al. |
| 2004/0249869 | A1 | 12/2004 | Oksanen |
| 2006/0020634 | A1 | 1/2006 | Huras et al. |
| 2008/0183973 | A1 | 7/2008 | Aguilera et al. |
| 2010/0050172 | A1 | 2/2010 | Ferris |
| 2010/0115284 | A1 * | 5/2010 | Hahn ................... G06F 21/64 713/179 |
| 2010/0192131 | A1 | 7/2010 | Dolby et al. |
| 2011/0035548 | A1 | 2/2011 | Kimmel et al. |
| 2011/0161496 | A1 | 6/2011 | Nicklin |
| 2012/0011106 | A1 | 1/2012 | Reid et al. |
| 2012/0041899 | A1 | 2/2012 | Greene et al. |
| 2012/0174112 | A1 | 7/2012 | Vaidya et al. |
| 2012/0191648 | A1 | 7/2012 | Kuber et al. |
| 2012/0254342 | A1 | 10/2012 | Evans |
| 2012/0297073 | A1 | 11/2012 | Glover et al. |
| 2012/0310885 | A1 | 12/2012 | Xu et al. |
| 2012/0310985 | A1 | 12/2012 | Gale et al. |
| 2012/0310986 | A1 | 12/2012 | Frantz et al. |
| 2012/0310991 | A1 | 12/2012 | Frantz et al. |
| 2013/0036281 | A1 | 2/2013 | Revah et al. |
| 2013/0042156 | A1 | 2/2013 | Srinivasan et al. |
| 2013/0080386 | A1 | 3/2013 | Dwyer et al. |
| 2013/0080388 | A1 | 3/2013 | Dwyer et al. |
| 2013/0086129 | A1 | 4/2013 | Brown et al. |

OTHER PUBLICATIONS

John Clarke "SQL Result Set Cache in Oracle 11 gR2" published Nov. 16, 2011 downloaded May 15, 2013 from http://www.centroid.com/knowledgebase/blog/sql-result-set-cache-in-oracle-11 gr2, pp. 1-27.

Jim Czuprynski "Oracle Database 11g: SQL Query Result Set Caching" published Jul. 30, 2008, downloaded May 15, 2013 from http://www.databasejournal.com/features/oracle/article.php/3760761/0racle-Database-11 g-SQL -Query-Result-Set-Caching.htm, pp. 1-7.

"Oracle Database JDBC Developer's Guide and Reference: Chapter 20 Statement and Result Set Caching"downloaded from http://docs.oracle.com/cd/B28359_01/java.1111b31224/stmtcach.htm via the Wayback Machine Nov. 27, 2011, pp. 1-8.

Adrian Billington "Query Result Cache in Oracle 11g" downloaded from http://web.archive.org/web/20080124161135/http://www.oracle-developer.net/display.php?id=503 via the Wayback Machine Jan. 4, 2008, pp. 1-20.

Julian Dontcheff "Bloom Filters for DBAs" published Aug. 28, 2012, downloaded from http://juliandontcheff.wordpress.com/2012/08/28/bloom-filters-for-dbas/ on May 14, 2013, pp. 1-4.

Julian Dyke "Result Cache Internals" Nov. 2007, pp. 1-38.

Michele Cyran et al "Oracle Database Concepts 10g Release 2 (10.2)" Oct. 2005, pp. 1-542.

Lance Ashdown et al "Oracle Database Concepts 11g Release 2 (11.2)" Sep. 2011, pp. 1-460.

"Isolation (database systems)" downloaded from http://en.wikipedia.org/wiki/Isolation_(database_systems) on May 15, 2013, pp. 1-7.

U.S. Appl. No. 61/794,572, filed Mar. 15, 2013, Anurag Windlass Gupta, et al.

U.S. Appl. No. 61/799,609, filed Mar. 15, 2013, Anurag Windlass Gupta, et al.

U.S. Appl. No. 61/794,612, filed Mar. 15, 2013, Pradeep Jnana Madhavarapu et al.

U.S. Appl. No. 61/794,658, filed Mar. 15, 2013, Anurag Windlass Gupta, et al.

U.S. Appl. No. 61/799,632, filed Mar. 15, 2013, Anurag Windlass Gupta, et al.

U.S. Appl. No. 13/892,027, filed May 10, 2013, Anurag Windlass Gupta, et al.

U.S. Appl. No. 13/873,467, filed Apr. 30, 2013, Anurag Windlass Gupta, et al.

U.S. Appl. No. 13/902,381, filed May 24, 2013, Anurag Windlass Gupta, et al.

U.S. Appl. No. 13/893,004, filed May 13, 2013, Laurion Darrell Burchall et al.

U.S. Appl. No. 13/901,111, filed May 23, 2013, Anurag Windlass Gupta, et al.

U.S. Appl. No. 13/894,969, filed May 15, 2013, Grant Alexander MacDonald McAlister et al.

U.S. Appl. No. 13/903,674, filed May 28, 2013, Anurag Windlass Gupta, et al.

U.S. Appl. No. 14/033,343, filed Sep. 20, 2013, Tengiz Kharatishvili et al.

U.S. Appl. No. 14/032,721, filed Sep. 20, 2013, Tengiz Kharatishvili et al.

U.S. Appl. No. 14/032,797, filed Sep. 20, 2013, Pradeep Jnana Madhavarapu et al.

U.S. Appl. No. 14/036,783, filed Sep. 25, 2013, Anurag Windlass Gupta, et al.

U.S. Appl. No. 14/036,792, filed Sep. 25, 2013, Samuel James McKelvie, et al.

U.S. Appl. No. 14/032,763, filed Sep. 20, 2013, Yan Valerie Leshinsky et al.

U.S. Appl. No. 14/032,681, filed Sep. 20, 2013, Samuel James McKelvie, et al.

U.S. Appl. No. 14/201,505, filed Mar. 7, 2014, Anurag Windlass Gupta.

U.S. Appl. No. 14/201,493, filed Mar. 7, 2014, Anurag Windlass Gupta.

U.S. Appl. No. 14/201,512, filed Mar. 7, 2014, Anurag Windlass Gupta.

U.S. Appl. No. 14/201,517, filed Mar. 7, 2014, Anurag Windlass Gupta.

Extended European Search Report from Application No. 14770899.4, Date Sep. 6, 2016, Amazon Technologies, Inc., pp. 1-7.

Latika C. Savade, et al., "A Technique to Searc Log Records using System of Linear Equations", Software Engineering (CONSEG), 2012 CSI Sixth International Conference on, IEEE, Sep. 5, 2012, pp. 1-4.

* cited by examiner

LOG RECORD MANAGEMENT

RELATED APPLICATIONS

This application claims benefit of priority to U.S. Provisional Application Ser. No. 61/794,612, entitled "LOG RECORD MANAGEMENT", which was filed Mar. 15, 2013, and which is incorporated herein by reference in its entirety.

BACKGROUND

Distribution of various components of a software stack can in some cases provide (or support) fault tolerance (e.g., through replication), higher durability, and less expensive solutions (e.g., through the use of many smaller, less-expensive components rather than fewer large, expensive components). However, databases have historically been among the components of the software stack that are least amenable to distribution. For example, it can difficult to distribute databases while still ensuring the so-called ACID properties (e.g., Atomicity, Consistency, Isolation, and Durability) that they are expected to provide.

While most existing relational databases are not distributed, some existing databases are "scaled out" (as opposed to being "scaled up" by merely employing a larger monolithic system) using one of two common models: a "shared nothing" model, and a "shared disk" model. In general, in a "shared nothing" model, received queries are decomposed into database shards (each of which includes a component of the query), these shards are sent to different compute nodes for query processing, and the results are collected and aggregated before they are returned. In general, in a "shared disk" model, every compute node in a cluster has access to the same underlying data. In systems that employ this model, great care must be taken to manage cache coherency. In both of these models, a large, monolithic database is replicated on multiple nodes (including all of the functionality of a stand-alone database instance), and "glue" logic is added to stitch them together. For example, in the "shared nothing" model, the glue logic may provide the functionality of a dispatcher that subdivides queries, sends them to multiple compute notes, and then combines the results. In a "shared disk" model, the glue logic may serve to fuse together the caches of multiple nodes (e.g., to manage coherency at the caching layer). These "shared nothing" and "shared disk" database systems can be costly to deploy and complex to maintain, and may over-serve many database use cases.

Figure 1:
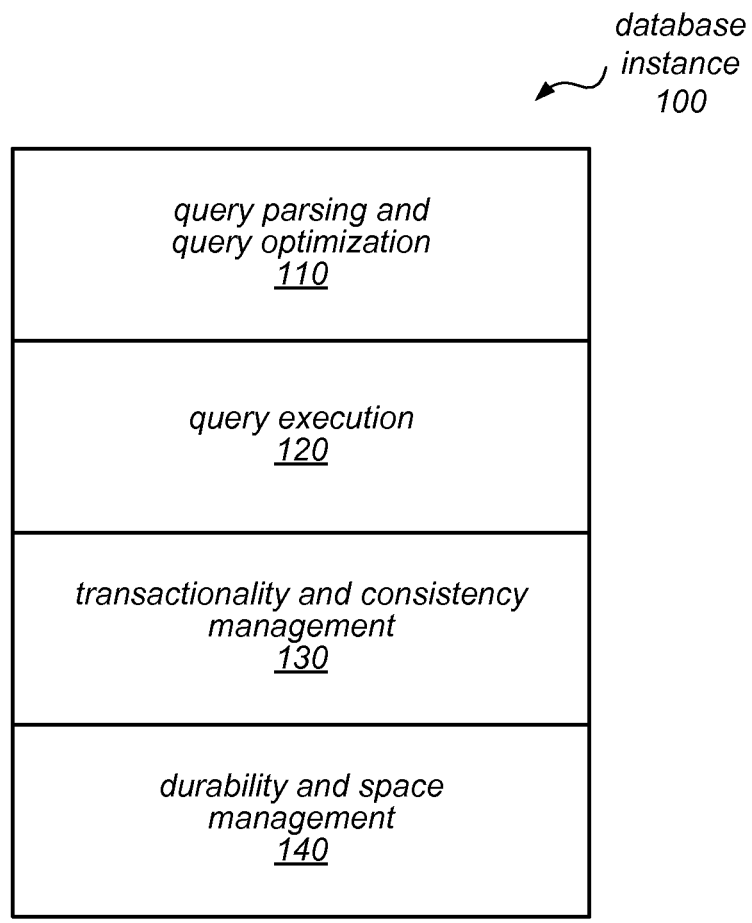
FIG. 1 is a block diagram illustrating various components of a database software stack, according to one embodiment.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of snapshot generation are disclosed. Various ones of the present embodiments may include a distributed storage system of a database service maintaining a plurality of log records. The log records may be associated with respective changes to data stored by the database service. Various ones of the present embodiments may include the distributed storage system generating a snapshot usable to read the data as of a state corresponding to the snapshot. Generating the snapshot may include generating metadata that is indicative of a particular log identifier (e.g., log sequence number, time stamp, etc.) of a particular one of the log records. In some embodiments, the metadata may also be indicative of a snapshot identifier. The disclosed snapshot generation techniques may be performed without reading, copying, or writing a data page as part of the snapshot generation.

Various embodiments of log record manipulation are also disclosed. Various ones of the present embodiments may include a distributed storage system of a database service receiving a plurality of log records. Various ones of the present embodiments may also include the distributed storage system storing the plurality of log records among a plurality of storage nodes of the distributed storage system. Various ones of the present embodiments may further include the distributed storage system transforming the plurality of log records. Transformation may include cropping, pruning, reducing, fusing, and/or otherwise deleting, merging, or adding records, among other transformations.

The specification first describes an example web services-based database service configured to implement the disclosed snapshot operations (e.g., creating, deletion, use, manipulation, etc.) and log record manipulation techniques. Included in the description of the example web services-based database service are various aspects of the example web services-based database service, such as a database engine and a separate distributed database storage service. The specification then describes flowcharts of various embodiments of methods for snapshot operations and log record manipulation. Next, the specification describes an example system that may implement the disclosed techniques. Various examples are provided throughout the specification.

The systems described herein may, in some embodiments, implement a web service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented database architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, log record manipulation, and/or various space management operations) may be offloaded from the database engine to the storage layer and distributed across multiple nodes and storage devices. For example, in some embodiments, rather than the database engine applying changes to database tables (or data pages thereof) and then sending the modified data pages to the storage layer, the application of changes to the stored database tables (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of onetenth the size of the corresponding data page for which it specifies a change. Note that requests sent from the database tier and the distributed storage system may be asynchronous and that multiple such requests may be in flight at a time.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

Turning now to the figures, FIG. 1 is a block diagram illustrating various components of a database software stack, according to one embodiment. As illustrated in this example, a database instance may include multiple functional components (or layers), each of which provides a portion of the functionality of the database instance. In this example, database instance 100 includes a query parsing and query optimization layer (shown as 110), a query execution layer (shown as 120), a transactionality and consistency management layer (shown as 130), and a durability and space management layer (shown as 140). As noted above, in some existing database systems, scaling a database instance may involve duplicating the entire database instance one or more times (including all of the layers illustrated in FIG. 1), and then adding glue logic to stitch them together. In some embodiments, the systems described herein may instead offload the functionality of durability and space management layer 140 from the database tier to a separate storage layer, and may distribute that functionality across multiple storage nodes in the storage layer.

In some embodiments, the database systems described herein may retain much of the structure of the upper half of the database instance illustrated in FIG. 1, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed database-optimized storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum. Similarly, for a read request directed to a particular segment, the client-side driver may route the read request to all of the nodes on which the segment is stored (e.g., asynchronously and in parallel, at substantially the same time). As soon as the client-side driver receives the requested data from a read quorum of the storage nodes in the protection group, it may return the requested data to the database tier (e.g., to the database engine head node).

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage.

In some embodiments, the database tier may support the use of synchronous or asynchronous read replicas in the system, e.g., read-only copies of data on different nodes of the database tier to which read requests can be routed. In such embodiments, if the database engine head node for a given database table receives a read request directed to a particular data page, it may route the request to any one (or a particular one) of these read-only copies. In some embodiments, the client-side driver in the database engine head node may be configured to notify these other nodes about updates and/or invalidations to cached data pages (e.g., in order to prompt them to invalidate their caches, after which they may request updated copies of updated data pages from the storage layer).

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database tables, a number of replication copies, zones, or regions and/or whether replication is synchronous or asynchronous based upon their durability, performance and cost objectives.

In some embodiments, the client side driver may maintain metadata about the volume and may directly send asynchronous requests to each of the storage nodes necessary to fulfill read requests and write requests without requiring additional hops between storage nodes. For example, in some embodiments, in response to a request to make a change to a database table, the client-side driver may be configured to determine the one or more nodes that are implementing the storage for the targeted data page, and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, many read requests may be served by the database engine head node cache. However, write requests may require durability, since large-scale failure events may be too common to allow only in-memory replication. Therefore, the systems described herein may be configured to minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

As previously noted, in some embodiments, the storage tier of the database system may be responsible for taking database snapshots. However, because the storage tier implements log-structured storage, taking a snapshot of a data page (e.g., a data block) may include recording a timestamp associated with the redo log record that was most recently applied to the data page/block (or a timestamp associated with the most recent operation to coalesce multiple redo log records to create a new version of the data page/block), and preventing garbage collection of the previous version of the page/block and any subsequent log entries up to the recorded point in time. In such embodiments, taking a database snapshot may not require reading, copying, or writing the data block, as would be required when employing an off-volume backup strategy. In some embodiments, the space requirements for snapshots may be minimal, since only modified data would require additional space, although user/subscribers may be able to choose how much additional space they want to keep for on-volume snapshots in addition to the active data set. In different embodiments, snapshots may be discrete (e.g., each snapshot may provide access to all of the data in a data page as of a specific point in time) or continuous (e.g., each snapshot may provide access to all versions of the data that existing in a data page between two points in time). In some embodiments, reverting to a prior snapshot may include recording a log record to indicate that all redo log records and data pages since that snapshot are invalid and garbage collectable, and discarding all database cache entries after the snapshot point. In such embodiments, no roll-forward may be required since the storage system will, on a block-by-block basis, apply redo log records to data blocks as requested and in the background across all nodes, just as it does in normal forward read/write processing. Crash recovery may thereby be made parallel and distributed across nodes. Additional details regarding snapshot creation, use, and/or manipulation is described at FIGS. 8 and 9.

Figure 2:
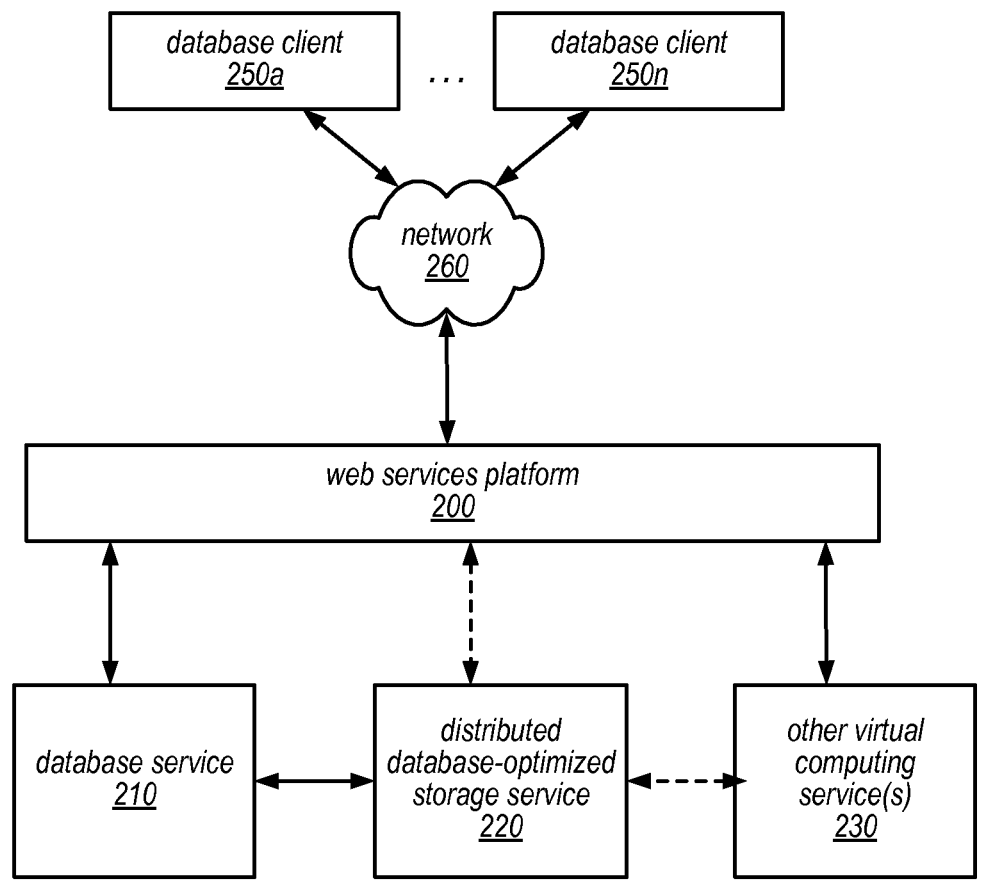
FIG. 2 is a block diagram illustrating a service system architecture that may be configured to implement a web services-based database service, according to some embodiments.

One embodiment of a service system architecture that may be configured to implement a web services-based database service is illustrated in FIG. 2. In the illustrated embodiment, a number of clients (shown as database clients 250a-250n) may be configured to interact with a web services platform 200 via a network 260. Web services platform 200 may be configured to interface with one or more instances of a database service 210, a distributed database-optimized storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit web services requests to web services platform 200 via network 260, including requests for database services (e.g., a request to generate a snapshot, etc.). For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing web services requests without necessarily implementing full browser support for all types of web-based data. That is, client 250 may be an application configured to interact directly with web services platform 200. In some embodiments, client 250 may be configured to generate web services requests according to a Representational State Transfer (REST)-style web services architecture, a document- or message-based web services architecture, or another suitable web services architecture.

In some embodiments, a client 250 (e.g., a database service client) may be configured to provide access to web services-based storage of database tables to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model of FIG. 1. Instead, the details of interfacing to Web services platform 200 may be coordinated by client 250 and the operating system or file system on behalf of applications executing within the operating system environment.

Clients 250 may convey web services requests (e.g., a snapshot request, parameters of a snapshot request, read request, restore a snapshot, etc.) to and receive responses from web services platform 200 via network 260. In various embodiments, network 260 may encompass any suitable combination of networking hardware and protocols necessary to establish web-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and web services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and web services platform 200. It is noted that in some embodiments, clients 250 may communicate with web services platform 200 using a private network rather than the public Internet. For example, clients 250 may be provisioned within the same enterprise as a database service system (e.g., a system that implements database service 210 and/or distributed database-optimized storage service 220). In such a case, clients 250 may communicate with platform 200 entirely through a private network 260 (e.g., a LAN or WAN that may use Internet-based communication protocols but which is not publicly accessible).

Generally speaking, web services platform 200 may be configured to implement one or more service endpoints configured to receive and process web services requests, such as requests to access data pages (or records thereof). For example, web services platform 200 may include hardware and/or software configured to implement a particular endpoint, such that an HTTP-based web services request directed to that endpoint is properly received and processed. In one embodiment, web services platform 200 may be implemented as a server system configured to receive web services requests from clients 250 and to forward them to components of a system that implements database service 210, distributed database-optimized storage service 220 and/or another virtual computing service 230 for processing. In other embodiments, web services platform 200 may be configured as a number of distinct systems (e.g., in a cluster topology) implementing load balancing and other request management features configured to dynamically manage large-scale web services request processing loads. In various embodiments, web services platform 200 may be configured to support REST-style or document-based (e.g., SOAP-based) types of web services requests.

In addition to functioning as an addressable endpoint for clients' web services requests, in some embodiments, web services platform 200 may implement various client management features. For example, platform 200 may coordinate the metering and accounting of client usage of web services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed database-optimized storage service 220 and/or another virtual computing service 230 (or the underlying systems that implement those services).

In some embodiments, platform 200 may also implement user authentication and access control procedures. For example, for a given web services request to access a particular database table, platform 200 may be configured to ascertain whether the client 250 associated with the request is authorized to access the particular database table. Platform 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, platform 200 may reject the corresponding web services request, for example by returning a response to the requesting client 250 indicating an error condition. Various access control policies may be stored as records or lists of access control information by database service 210, distributed database-optimized storage service 220 and/or other virtual computing services 230.

It is noted that while web services platform 200 may represent the primary interface through which clients 250 may access the features of a database system that implements database service 210, it need not represent the sole interface to such features. For example, an alternate API that may be distinct from a web services interface may be used to allow clients internal to the enterprise providing the database system to bypass web services platform 200. Note that in many of the examples described herein, distributed database-optimized storage service 220 may be internal to a computing system or an enterprise system that provides database services to clients 250, and may not be exposed to external clients (e.g., users or client applications). In such embodiments, the internal "client" (e.g., database service 210) may access distributed database-optimized storage service 220 over a local or private network, shown as the solid line between distributed database-optimized storage service 220 and database service 210 (e.g., through an API directly between the systems that implement these services). In such embodiments, the use of distributed database-optimized storage service 220 in storing database tables on behalf of clients 250 may be transparent to those clients. In other embodiments, distributed database-optimized storage service 220 may be exposed to clients 250 through web services platform 200 to provide storage of database tables or other information for applications other than those that rely on database service 210 for database management. This is illustrated in FIG. 2 by the dashed line between web services platform 200 and distributed database-optimized storage service 220. In such embodiments, clients of the distributed database-optimized storage service 220 may access distributed database-optimized storage service 220 via network 260 (e.g., over the Internet). In some embodiments, a virtual computing service 230 may be configured to receive storage services from distributed database-optimized storage service 220 (e.g., through an API directly between the virtual computing service 230 and distributed database-optimized storage service 220) to store objects used in performing computing services 230 on behalf of a client 250. This is illustrated in FIG. 2 by the dashed line between virtual computing service 230 and distributed database-optimized storage service 220. In some cases, the accounting and/or credentialing services of platform 200 may be unnecessary for internal clients such as administrative clients or between service components within the same enterprise.

Note that in various embodiments, different storage policies may be implemented by database service 210 and/or distributed database-optimized storage service 220. Examples of such storage policies may include a durability policy (e.g., a policy indicating the number of instances of a database table (or data page thereof) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, distributed database-optimized storage service 220 may implement a higher durability for redo log records than for data pages.

Figure 3:
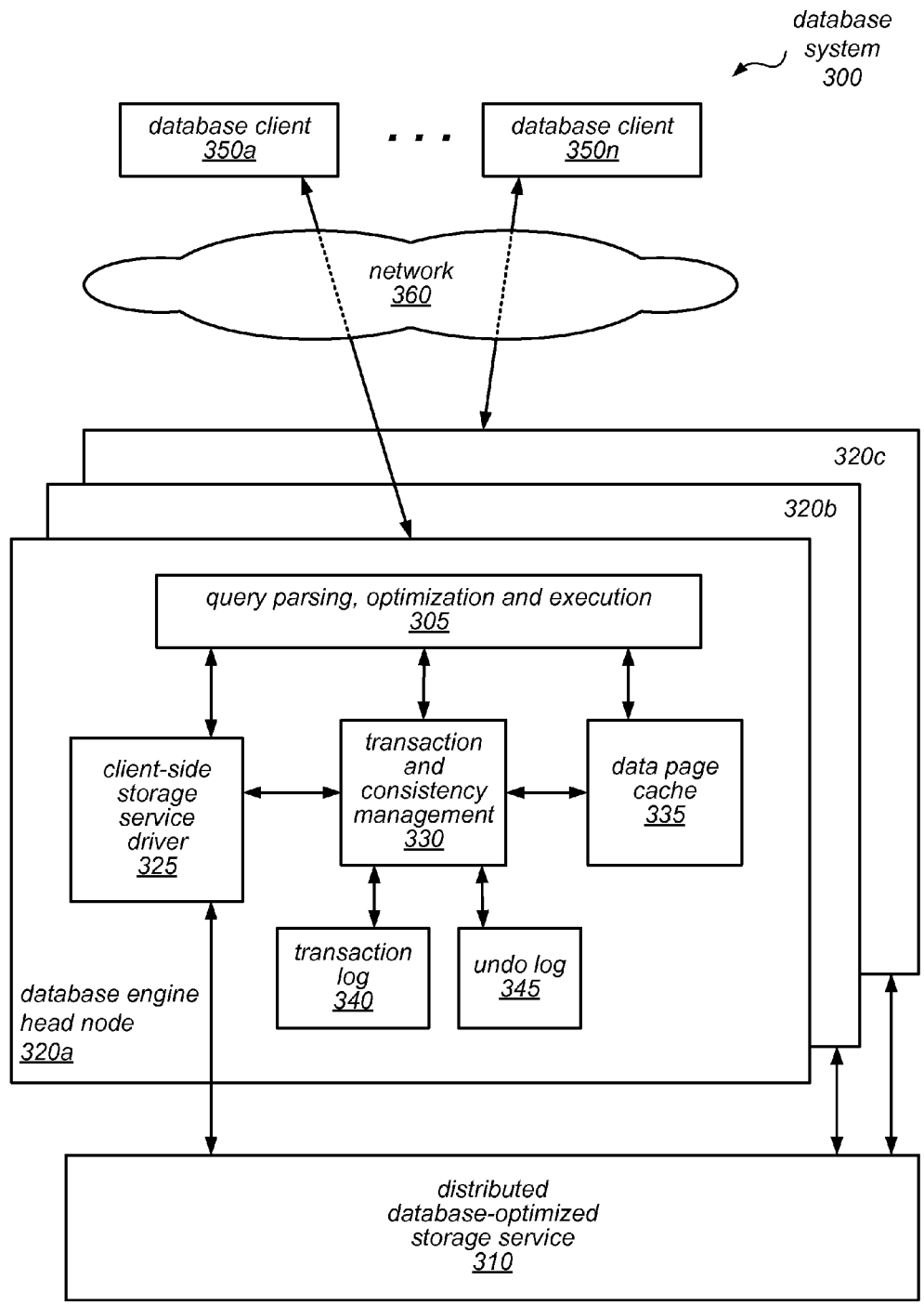
FIG. 3 is a block diagram illustrating various components of a database system that includes a database engine and a separate distributed database storage service, according to one embodiment.

FIG. 3 is a block diagram illustrating various components of a database system that includes a database engine and a separate distributed database storage service, according to one embodiment. In this example, database system 300 includes a respective database engine head node 320 for each of several database tables and a distributed database-optimized storage service 310 (which may or may not be visible to the clients of the database system, shown as database clients 350a-350n). As illustrated in this example, one or more of database clients 350a-350n may access a database head node 320 (e.g., head node 320a, head node 320b, or head node 320c, each of which is a component of a respective database instance) via network 360 (e.g., these components may be network-addressable and accessible to the database clients 350a-350n). However, distributed database-optimized storage service 310, which may be employed by the database system to store data pages of one or more database tables (and redo log records and/or other metadata associated therewith) on behalf of database clients 350a-350n, and to perform other functions of the database system as described herein, may or may not be network-addressable and accessible to the storage clients 350a-350n, in different embodiments. For example, in some embodiments, distributed database-optimized storage service 310 may perform various storage, access, change logging, recovery, log record manipulation, and/or space management operations in a manner that is invisible to storage clients 350a-350n.

As previously noted, each database instance may include a single database engine head node 320 that receives requests (e.g., a snapshot request, etc.) from various client programs (e.g., applications) and/or subscribers (users), then parses them, optimizes them, and develops an execution plan to carry out the associated database operation(s). In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records to various storage nodes within distributed database-optimized storage service 310, receive write acknowledgements from distributed database-optimized storage service 310, receive requested data pages from distributed database-optimized storage service 310, and/or return data pages, error messages, or other responses to query parsing, optimization, and execution component 305 (which may, in turn, return them to database client 350a).

In this example, database engine head node 320a includes a data page cache 335, in which data pages that were recently accessed may be temporarily held. As illustrated in FIG. 3, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance. As illustrated in FIG. 3, database engine head node 320a may also include a transaction log 340 and an undo log 345, which may be employed by transaction and consistency management component 330 to track the status of various transactions and roll back any locally cached results of transactions that do not commit.

Note that each of the other database engine head nodes 320 illustrated in FIG. 3 (e.g., 320b and 320c) may include similar components and may perform similar functions for queries received by one or more of database clients 350a-350n and directed to the respective database instances of which it is a component.

In some embodiments, the distributed database-optimized storage systems described herein may organize data in various logical volumes, segments, and pages for storage on one or more storage nodes. For example, in some embodiments, each database table is represented by a logical volume, and each logical volume is segmented over a collection of storage nodes. Each segment, which lives on a particular one of the storage nodes, contains a set of contiguous block addresses. In some embodiments, each data page is stored in a segment, such that each segment stores a collection of one or more data pages and a change log (also referred to as a redo log) (e.g., a log of redo log records) for each data page that it stores. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the database table is being maintained in the database system). For example, in different embodiments, one, two, or three copies of the data or change logs may be stored in each of one, two, or three different availability zones or regions, according to a default configuration, an application-specific durability preference, or a client-specified durability preference.

As used herein, the following terms may be used to describe the organization of data by a distributed database-optimized storage system, according to various embodiments.

Volume: A volume is a logical concept representing a highly durable unit of storage that a user/client/application of the storage system understands. More specifically, a volume is a distributed store that appears to the user/client/application as a single consistent ordered log of write operations to various user pages of a database table. Each write operation may be encoded in a User Log Record (ULR), which represents a logical, ordered mutation to the contents of a single user page within the volume. As noted above, a ULR may also be referred to herein as a redo log record. Each ULR may include a unique identifier (e.g., a Logical Sequence Number (LSN), time stamp, etc.). Note that the unique identifier may be monotonically increasing and unique for a particular one of the log records. Also note that gaps may exist in the sequence of identifiers assigned to log records. For example, in the LSN example, LSNs 1, 4, 5, 6, and 9 may be assigned to five respective log records with LSNs 2, 3, 7, and 8 not being used. Each ULR may be persisted to one or more synchronous segments in the distributed store that form a Protection Group (PG), to provide high durability and availability for the ULR. A volume may provide an LSN-type read/write interface for a variable-size contiguous range of bytes.

In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment is a limited-durability unit of storage assigned to a single storage node. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page is a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page is a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Control Log Records (CLRs), which are generated by the storage system, may contain control information used to keep track of metadata such as the current unconditional volume durable LSN (VDL). Null Log Records (NLRs) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record is the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log(which is described below).

User pages: User pages are the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware.

Data page: A data page is a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node is a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

SSD: As referred to herein, the term "SSD" may refer to a local block storage volume as seen by the storage node, regardless of the type of storage employed by that storage volume, e.g., disk, a solid-state drive, a battery-backed RAM, an NVMRAM device (e.g., one or more NVDIMMs), or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 4:
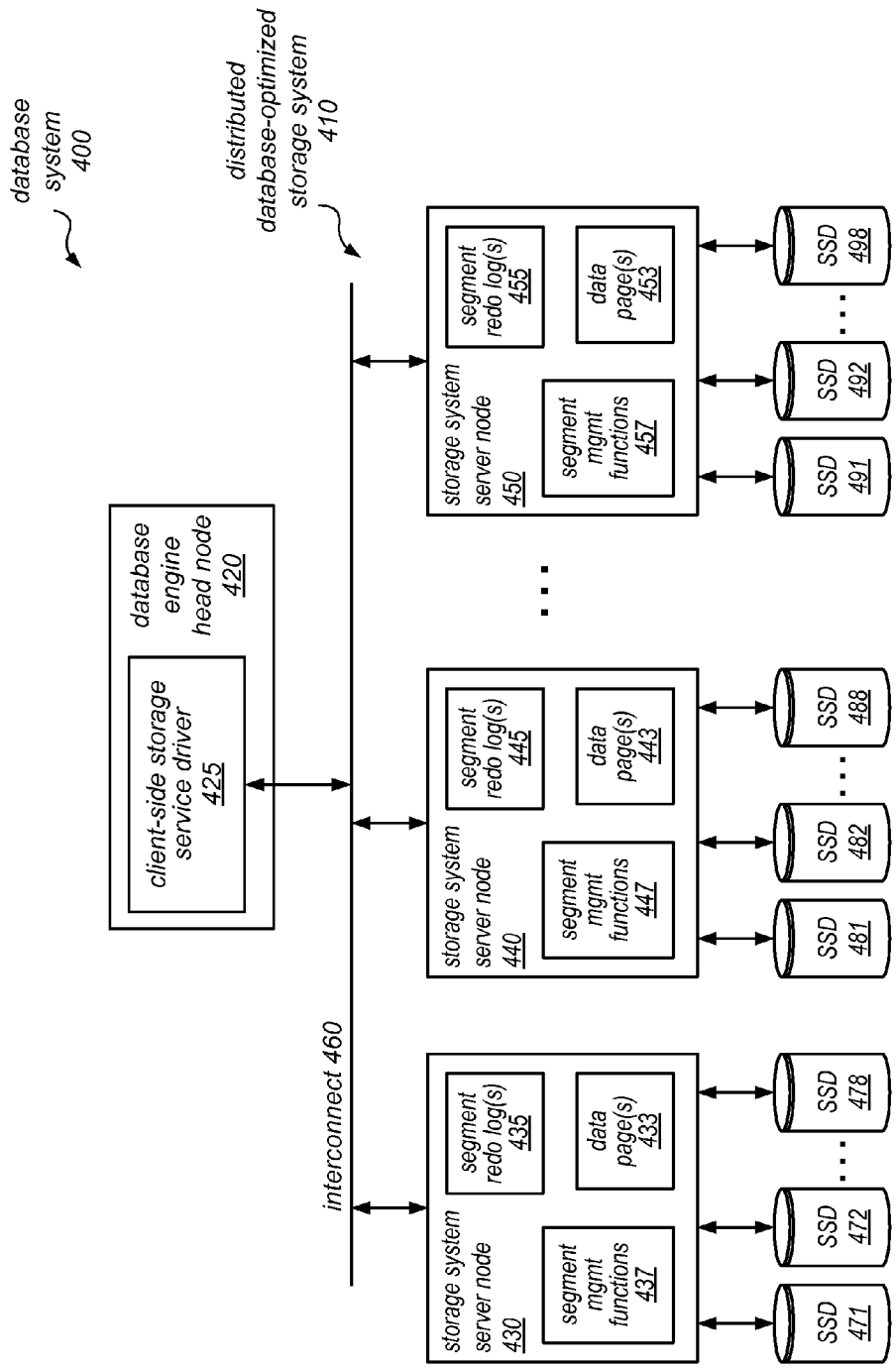
FIG. 4 is a block diagram illustrating a distributed database-optimized storage system, according to one embodiment.

One embodiment of a distributed database-optimized storage system is illustrated by the block diagram in FIG. 4. In this example, a database system 400 includes a distributed database-optimized storage system 410, which communicates with a database engine head node 420 over interconnect 460. As in the example illustrated in FIG. 3, database engine head node 420 may include a client-side storage service driver 425. In this example, distributed database-optimized storage system 410 includes multiple storage system server nodes (including those shown as 430, 440, and 450), each of which includes storage for data pages and redo logs for the segment(s) it stores, and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery, and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 4, storage system server node 430 includes data page(s) 433, segment redo log(s) 435, segment management functions 437, and attached SSDs 471-478. Again note that the label "SSD" may or may not refer to a solid-state drive, but may more generally refer to a local block storage volume, regardless of its underlying hardware. Similarly, storage system server node 440 includes data page(s) 443, segment redo log(s) 445, segment management functions 447, and attached SSDs 481-488; and storage system server node 450 includes data page(s) 453, segment redo log(s) 455, segment management functions 457, and attached SSDs 491-498.

As previously noted, in some embodiments, a sector is the unit of alignment on an SSD and may be the maximum size on an SSD that can be written without the risk that the write will only be partially completed. For example, the sector size for various solid-state drives and spinning media may be 4 KB. In some embodiments of the distributed database-optimized storage systems described herein, each and every sector may include have a 64-bit (8 byte) CRC at the beginning of the sector, regardless of the higher-level entity of which the sector is a part. In such embodiments, this CRC (which may be validated every time a sector is read from SSD) may be used in detecting corruptions. In some embodiments, each and every sector may also include a "sector type" byte whose value identifies the sector as a log sector, a data sector, or an uninitialized sector. For example, in some embodiments, a sector type byte value of 0 may indicate that the sector is uninitialized.

In some embodiments, each of the storage system server nodes in the distributed database-optimized storage system may implement a set of processes running on the node server's operating system that manage communication with the database engine head node, e.g., to receive redo logs, send back data pages, etc. In some embodiments, all data blocks written to the distributed database-optimized storage system may be backed up to long-term and/or archival storage (e.g., in a remote key-value durable backup storage system).

Figure 5:
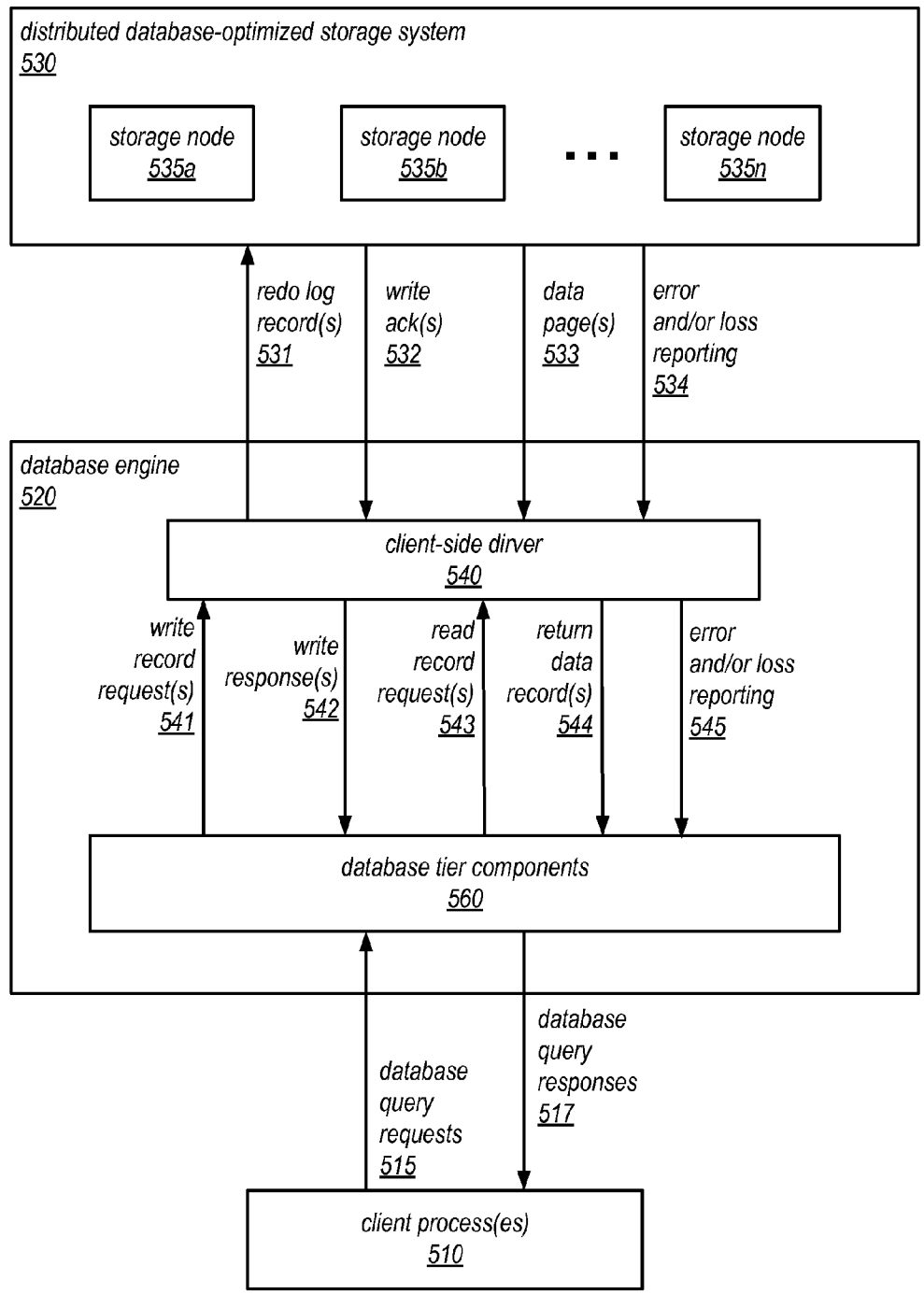
FIG. 5 is a block diagram illustrating the use of a separate distributed database-optimized storage system in a database system, according to one embodiment.

FIG. 5 is a block diagram illustrating the use of a separate distributed database-optimized storage system in a database system, according to one embodiment. In this example, one or more client processes 510 may store data to one or more database tables maintained by a database system that includes a database engine 520 and a distributed database-optimized storage system 530. In the example illustrated in FIG. 5, database engine 520 includes database tier components 560 and client-side driver 540 (which serves as the interface between distributed database-optimized storage system 530 and database tier components 560). In some embodiments, database tier components 560 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3).

In this example, one or more client processes 510 may send database query requests 515 (which may include read and/or write requests targeting data stored on one or more of the storage nodes 535a - 535n) to database tier components 560, and may receive database query responses 517 from database tier components 560 (e.g., responses that include write acknowledgements and/or requested data). Each database query request 515 that includes a request to write to a data page may be parsed and optimized to generate one or more write record requests 541, which may be sent to client-side driver 540 for subsequent routing to distributed database-optimized storage system 530. In this example, client-side driver 540 may generate one or more redo log records 531 corresponding to each write record request 541, and may send them to specific ones of the storage nodes 535 of distributed database-optimized storage system 530. Distributed database-optimized storage system 530 may return a corresponding write acknowledgement 532 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In this example, each database query request 515 that includes a request to read a data page may be parsed and optimized to generate one or more read record requests 543, which may be sent to client-side driver 540 for subsequent routing to distributed database-optimized storage system 530. In this example, client-side driver 540 may send these requests to specific ones of the storage nodes 535 of distributed database-optimized storage system 530, and distributed database-optimized storage system 530 may return the requested data pages 533 to database engine 520 (specifically to client-side driver 540). Client-side driver 540 may send the returned data pages to the database tier components 560 as return data records 544, and database tier components 560 may then send the data pages to one or more client processes 510 as database query responses 517.

In some embodiments, various error and/or data loss messages 534 may be sent from distributed database-optimized storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, the APIs 531-534 of distributed database-optimized storage system 530 and the APIs 541-545 of client-side driver 540 may expose the functionality of the distributed database-optimized storage system 530 to database engine 520 as if database engine 520 were a client of distributed database-optimized storage system 530. For example, database engine 520 (through client-side driver 540) may write redo log records or request data pages through these APIs to perform (or facilitate the performance of) various operations of the database system implemented by the combination of database engine 520 and distributed database-optimized storage system 530 (e.g., storage, access, change logging, recovery, and/or space management operations). As illustrated in FIG. 5, distributed database-optimized storage system 530 may store data blocks on storage nodes 535*a*-535*n*, each of which may have multiple attached SSDs. In some embodiments, distributed database-optimized storage system 530 may provide high durability for stored data block through the application of various types of redundancy schemes.

Note that in various embodiments, the API calls and responses between database engine 520 and distributed database-optimized storage system 530 (e.g., APIs 531-534) and/or the API calls and responses between client-side driver 540 and database tier components 560 (e.g., APIs 541-545) in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine 520 and/or distributed database-optimized storage system 530.

As noted above, in some embodiments, the functional components of a database system may be partitioned between those that are performed by the database engine and those that are performed in a separate, distributed, database-optimized storage system. In one specific example, in response to receiving a request from a client process (or a thread thereof) to insert something into a database table (e.g., to update a single data block by adding a record to that data block), one or more components of the database engine head node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the database engine head node to generate a redo log record to be sent to one of the nodes in the distributed database-optimized storage service and to send it to the distributed database-optimized storage service (along with other redo logs generated in response to other client requests) in an order and/or with timing that ensures the ACID properties are met for this transaction. Upon receiving the redo log record (which may also be referred to as an update record), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log both of which may be used locally (in the database tier) for ensuring transactionality. However, unlike in traditional database systems, the systems described herein may shift the responsibility for applying changes to data blocks to the storage system (rather than applying them at the database tier and shipping the modified data blocks to the storage system). Moreover, as described herein at FIGS. 8-9, in various embodiments, snapshot operations and/or log manipulations may be performed by the storage system as well.

A variety of different allocation models may be implemented for an SSD, in different embodiments. For example, in some embodiments, log entry pages and physical application pages may be allocated from a single heap of pages associated with an SSD device. This approach may have the advantage of leaving the relative amount of storage consumed by log pages and data pages to remain unspecified and to adapt automatically to usage. It may also have the advantage of allowing pages to remain unprepared until they are used, and repurposed at will without preparation. In other embodiments, an allocation model may partition the storage device into separate spaces for log entries and data pages. Once such allocation model is illustrated by the block diagram in FIG. 6 and described below.

Figure 6:
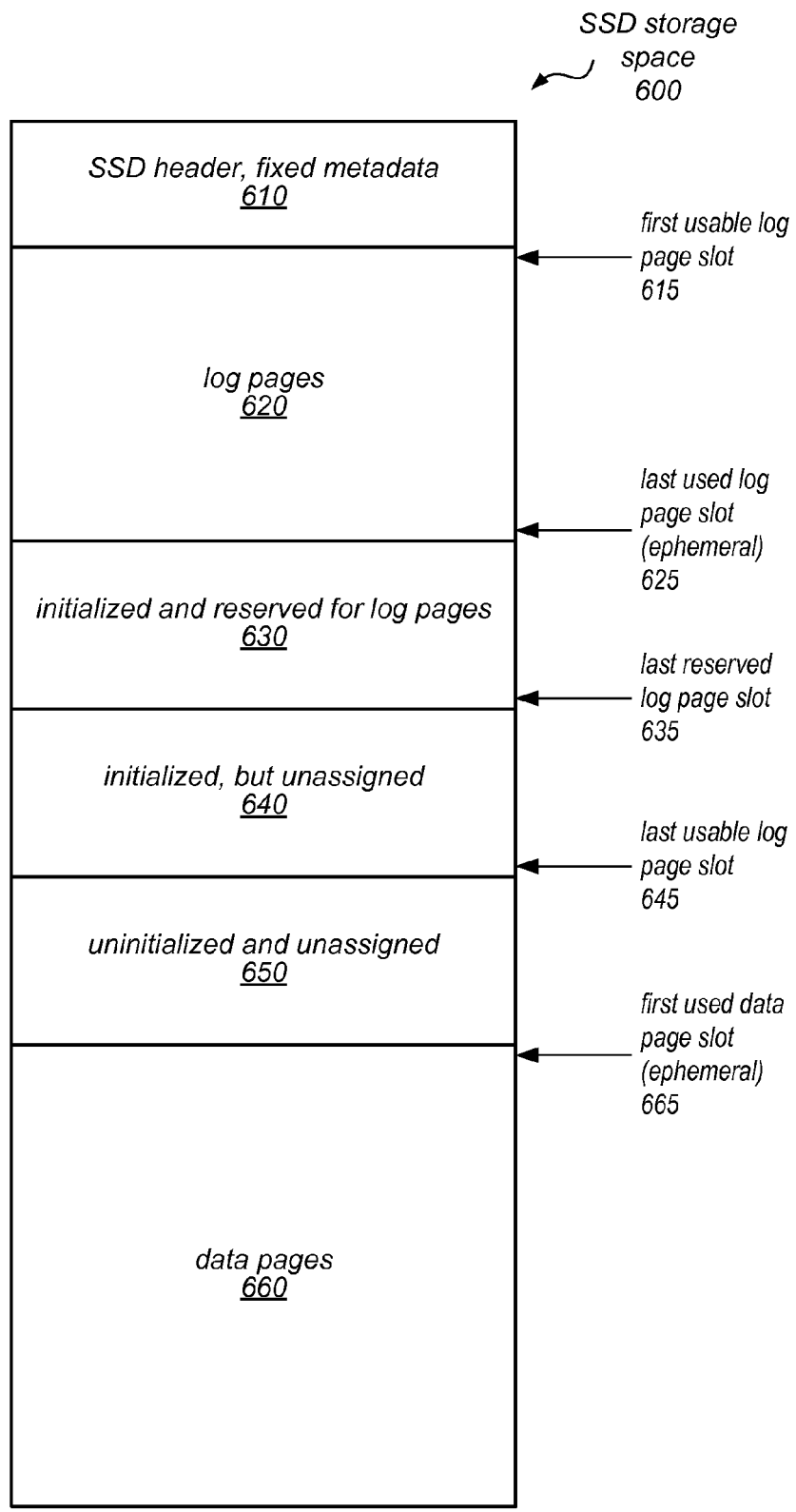
FIG. 6 is a block diagram illustrating how data and metadata may be stored on a given node of a distributed database-optimized storage system, according to one embodiment.

FIG. 6 is a block diagram illustrating how data and metadata may be stored on a given storage node (or persistent storage device) of a distributed database-optimized storage system, according to one embodiment. In this example, SSD storage space 600 stores an SSD header and other fixed metadata in the portion of the space labeled 610. It stores log pages in the portion of the space labeled 620, and includes a space labeled 630 that is initialized and reserved for additional log pages. One portion of SSD storage space 600 (shown as 640) is initialized, but unassigned, and another portion of the space (shown as 650) is uninitialized and unassigned. Finally, the portion of SSD storage space 600 labeled 660 stores data pages.

In this example, the first usable log page slot is noted as 615, and the last used log page slot (ephemeral) is noted as 625. The last reserved log page slot is noted as 635, and the last usable log page slot is noted as 645. In this example, the first used data page slot (ephemeral) is noted as 665. In some embodiments, the positions of each of these elements (615, 625, 635, 645, and 665) within SSD storage space 600 may be identified by a respective pointer.

In allocation approach illustrated in FIG. 6, valid log pages may be packed into the beginning of the flat storage space. Holes that open up due to log pages being freed may be reused before additional log page slots farther into the address space are used. For example, in the worst case, the first n log page slots contain valid log data, where n is the largest number of valid log pages that have ever simultaneously existed. In this example, valid data pages may be packed into the end of the flat storage space. Holes that open up due to data pages being freed may be reused before additional data page slots lower in the address space are used. For example, in the worst case, the last m data pages contain valid data, where m is the largest number of valid data pages that have ever simultaneously existed.

In some embodiments, before a log page slot can become part of the potential set of valid log page entries, it must be initialized to a value that cannot be confused for a valid future log entry page. This is implicitly true for recycled log page slots, since a retired log page has enough metadata to never be confused for a new valid log page. However, when a storage device is first initialized, or when space is reclaimed that had potentially been used to store application data pages, the log page slots must be initialized before they are added to the log page slot pool. In some embodiments, rebalancing/reclaiming log space may be performed as a background task.

In the example illustrated in FIG. 6, the current log page slot pool includes the area between the first usable log page slot (at 615) and the last reserved log page slot (625). In some embodiments, this pool may safely grow up to last usable log page slot (625) without re-initialization of new log page slots (e.g., by persisting an update to the pointer that identifies the last reserved log page slot, 635). In this example, beyond the last usable log page slot (which is identified by pointer 645), the pool may grow up to the first used data page slot (which is identified by pointer 665) by persisting initialized log page slots and persistently updating the pointer for the last usable log page slot (645). In this example, the previously uninitialized and unassigned portion of the SSD storage space 600 shown as 650 may be pressed into service to store log pages. In some embodiments, the current log page slot pool may be shrunk down to the position of the last used log page slot (which is identified by pointer) by persisting an update to the pointer for the last reserved log page slot (635).

In the example illustrated in FIG. 6, the current data page slot pool includes the area between the last usable log page slot (which is identified by pointer 645) and the end of SSD storage space 600. In some embodiments, the data page pool may be safely grown to the position identified by the pointer to the last reserved log page slot (635) by persisting an update to the pointer to the last usable log page slot (645). In this example, the previously initialized, but unassigned portion of the SSD storage space 600 shown as 640 may be pressed into service to store data pages. Beyond this, the pool may be safely grown to the position identified by the pointer to the last used log page slot (625) by persisting updates to the pointers for the last reserved log page slot (635) and the last usable log page slot (645), effectively reassigning the portions of SSD storage space 600 shown as 630 and 640 to store data pages, rather than log pages. In some embodiments, the data page slot pool may be safely shrunk down to the position identified by the pointer to the first used data page slot (665) by initializing additional log page slots and persisting an update to the pointer to the last usable log page slot (645).

In embodiments that employ the allocation approach illustrated in FIG. 6, page sizes for the log page pool and the data page pool may be selected independently, while still facilitating good packing behavior. In such embodiments, there may be no possibility of a valid log page linking to a spoofed log page formed by application data, and it may be possible to distinguish between a corrupted log and a valid log tail that links to an as-yet-unwritten next page. In embodiments that employ the allocation approach illustrated in FIG. 6, at startup, all of the log page slots up to the position identified by the pointer to the last reserved log page slot (635) may be rapidly and sequentially read, and the entire log index may be reconstructed (including inferred linking/ordering). In such embodiments, there may be no need for explicit linking between log pages, since everything can be inferred from LSN sequencing constraints.

In some embodiments, a segment may consist of three main parts (or zones): one that contains a hot log, one that contains a cold log, and one that contains user page data. Zones are not necessarily contiguous regions of an SSD. Rather, they can be interspersed at the granularity of the storage page. In addition, there may be a root page for each segment that stores metadata about the segment and its properties. For example, the root page for a segment may store the user page size for the segment, the number of user pages in the segment, the current beginning/head of the hot log zone (which may be recorded in the form of a flush number), the volume epoch, and/or access control metadata.

In some embodiments, the hot log zone may accept new writes from the client as they are received by the storage node. Both Delta User Log Records (DULRs), which specify a change to a user/data page in the form of a delta from the previous version of the page, and Absolute User Log Records (AULRs), which specify the contents of a complete user/data page, may be written completely into the log. Log records may be added to this zone in approximately the order they are received (e.g., they are not sorted by LSN) and they can span across log pages. The log records may be self-describing, e.g., they may contain an indication of their own size. In some embodiments, no garbage collection is performed in this zone. Instead, space may be reclaimed by truncating from the beginning of the log after all required log records have been copied into the cold log. Log sectors in the hot zone may be annotated with the most recent known unconditional VDL each time a sector is written. Conditional VDL CLRs may be written into the hot zone as they are received, but only the most recently written VDL CLR may be meaningful.

In some embodiments, every time a new log page is written, it may be assigned a flush number. The flush number may be written as part of every sector within each log page. Flush numbers may be used to determine which log page was written later when comparing two log pages. Flush numbers are monotonically increasing and scoped to an SSD (or storage node). For example, a set of monotonically increasing flush numbers is shared between all segments on an SSD (or all segments on a storage node).

In some embodiments, in the cold log zone, log records may be stored in increasing order of their LSNs. In this zone, AULRs may not necessarily store data in-line, depending on their size. For example, if they have large payloads, all or a portion of the payloads may be stored in the data zone and they may point to where their data is stored in the data zone. In some embodiments, log pages in the cold log zone may be written one full page at a time, rather than sector-by-sector. Because log pages in the cold zone are written a full page at a time, any log page in the cold zone for which the flush numbers in all sectors are not identical may be considered to be an incompletely written page and may be ignored. In some embodiments, in the cold log zone, DULRs may be able to span across log pages (up to a maximum of two log pages). However, AULRs may not be able to span log sectors, e.g., so that a coalesce operation will be able to replace a DULR with an AULR in a single atomic write.

In some embodiments, the cold log zone is populated by copying log records from the hot log zone. In such embodiments, only log records whose LSN is less than or equal to the current unconditional volume durable LSN (VDL) may be eligible to be copied to the cold log zone. When moving log records from the hot log zone to the cold log zone, some log records (such as many CLRs) may not need to be copied because they are no longer necessary. In addition, some additional coalescing of user pages may be performed at this point, which may reduce the amount of copying required. In some embodiments, once a given hot zone log page has been completely written and is no longer the newest hot zone log page, and all ULRs on the hot zone log page have been successfully copied to the cold log zone, the hot zone log page may be freed and reused.

In some embodiments, garbage collection may be done in the cold log zone to reclaim space occupied by obsolete log records, e.g., log records that no longer need to be stored in the SSDs of the storage tier. For example, a log record may become obsolete when there is a subsequent AULR for the same user page and the version of the user page represented by the log record is not needed for retention on SSD. In some embodiments, a garbage collection process may reclaim space by merging two or more adjacent log pages and replacing them with fewer new log pages containing all of the non-obsolete log records from the log pages that they are replacing. The new log pages may be assigned new flush numbers that are larger than the flush numbers of the log pages they are replacing. After the write of these new log pages is complete, the replaced log pages may be added to the free page pool. Note that in some embodiments, there may not be any explicit chaining of log pages using any pointers. Instead, the sequence of log pages may be implicitly determined by the flush numbers on those pages. Whenever multiple copies of a log record are found, the log record present in the log page with highest flush number may be considered to be valid and the others may be considered to be obsolete.

In some embodiments, e.g., because the granularity of space managed within a data zone (sector) may be different from the granularity outside the data zone (storage page), there may be some fragmentation. In some embodiments, to keep this fragmentation under control, the system may keep track of the number of sectors used by each data page, may preferentially allocate from almost-full data pages, and preferentially garbage collect almost-empty data pages (may require moving data to a new location if it is still relevant). Note that pages allocated to a segment may in some embodiments be repurposed among the three zones. For example, when a page that was allocated to a segment is freed, it may remain associated with that segment for some period of time and may subsequently be used in any of the three zones of that segment. The sector header of every sector may indicate the zone to which the sector belongs. Once all sectors in a page are free, the page may be returned to a common free storage page pool that is shared across zones. This free storage page sharing may in some embodiments reduce (or avoid) fragmentation.

In some embodiments, the distributed database-optimized storage systems described herein may maintain various data structures in memory. For example, for each user page present in a segment, a user page table may store a bit indicating whether or not this user page is "cleared" (i.e., whether it includes all zeroes), the LSN of the latest log record from the cold log zone for the page, and an array/list of locations of all log records from the hot log zone for page. For each log record, the user page table may store the sector number, the offset of the log record within that sector, the number of sectors to read within that log page, the sector number of a second log page (if the log record spans log pages), and the number of sectors to read within that log page. In some embodiments, the user page table may also store the LSNs of every log record from the cold log zone and/or an array of sector numbers for the payload of the latest AULR if it is in the cold log zone.

In some embodiments of the distributed database-optimized storage systems described herein, an LSN index may be stored in memory. An LSN index may map LSNs to log pages within the cold log zone. Given that log records in cold log zone are sorted, it may be to include one entry per log page. However, in some embodiments, every non-obsolete LSN may be stored in the index and mapped to the corresponding sector numbers, offsets, and numbers of sectors for each log record.

In some embodiments of the distributed database-optimized storage systems described herein, a log page table may be stored in memory, and the log page table may be used during garbage collection of the cold log zone. For example, the log page table may identify which log records are obsolete (e.g., which log records can be garbage collected) and how much free space is available on each log page.

In the storage systems described herein, an extent may be a logical concept representing a highly durable unit of storage that can be combined with other extents (either concatenated or striped) to represent a volume. Each extent may be made durable by membership in a single protection group. An extent may provide an LSN-type read/write interface for a contiguous byte sub-range having a fixed size that is defined at creation. Read/write operations to an extent may be mapped into one or more appropriate segment read/write operations by the containing protection group. As used herein, the term "volume extent" may refer to an extent that is used to represent a specific sub-range of bytes within a volume.

As noted above, a volume may consist of multiple extents, each represented by a protection group consisting of one or more segments. In some embodiments, log records directed to different extents may have interleaved LSNs. For changes to the volume to be durable up to a particular LSN it may be necessary for all log records up to that LSN to be durable, regardless of the extent to which they belong. In some embodiments, the client may keep track of outstanding log records that have not yet been made durable, and once all ULRs up to a specific LSN are made durable, it may send a Volume Durable LSN (VDL) message to one of the protection groups in the volume. The VDL may be written to all synchronous mirror segments for the protection group. This is sometimes referred to as an "Unconditional VDL" and it may be periodically persisted to various segments (or more specifically, to various protection groups) along with write activity happening on the segments. In some embodiments, the Unconditional VDL may be stored in log sector headers.

In various embodiments, the operations that may be performed on a segment may include writing a DULR or AULR received from a client (which may involve writing the DULR or AULR to the tail of the hot log zone and then updating the user page table), reading a cold user page (which may involve locating the data sectors of the user page and returning them without needing to apply any additional DULRs), reading a hot user page (which may involve locating the data sectors of the most recent AULR for the user page and apply any subsequent DULRs to the user page before returning it), replacing DULRs with AULRs (which may involve coalescing DULRs for a user page to create an AULR that replaces the last DULR that was applied), manipulating the log records, etc. As described herein coalescing is the process of applying DULRs to an earlier version of a user page to create a later version of the user page. Coalescing a user page may help reduce read latency because (until another DULR is written) all DULRs written prior to coalescing may not need to be read and applied on demand. It may also help reclaim storage space by making old AULRs and DULRs obsolete (provided there is no snapshot requiring the log records to be present). In some embodiments, a coalescing operation may include locating a most recent AULR and applying any subsequent DULRs in sequence without skipping any of the DULRs. As noted above, in some embodiments, coalescing may not be performed within the hot log zone. Instead, it may be performed within the cold log zone. In some embodiments, coalescing may also be performed as log records are copied from the hot log zone to the cold log zone.

In some embodiments, the decision to coalesce a user page may be triggered by the size of the pending DULR chain for the page (e.g., if the length of the DULR chain exceeds a pre-defined threshold for a coalescing operation, according to a system-wide, application-specific or client-specified policy)), or by the user page being read by a client.

Figure 7:
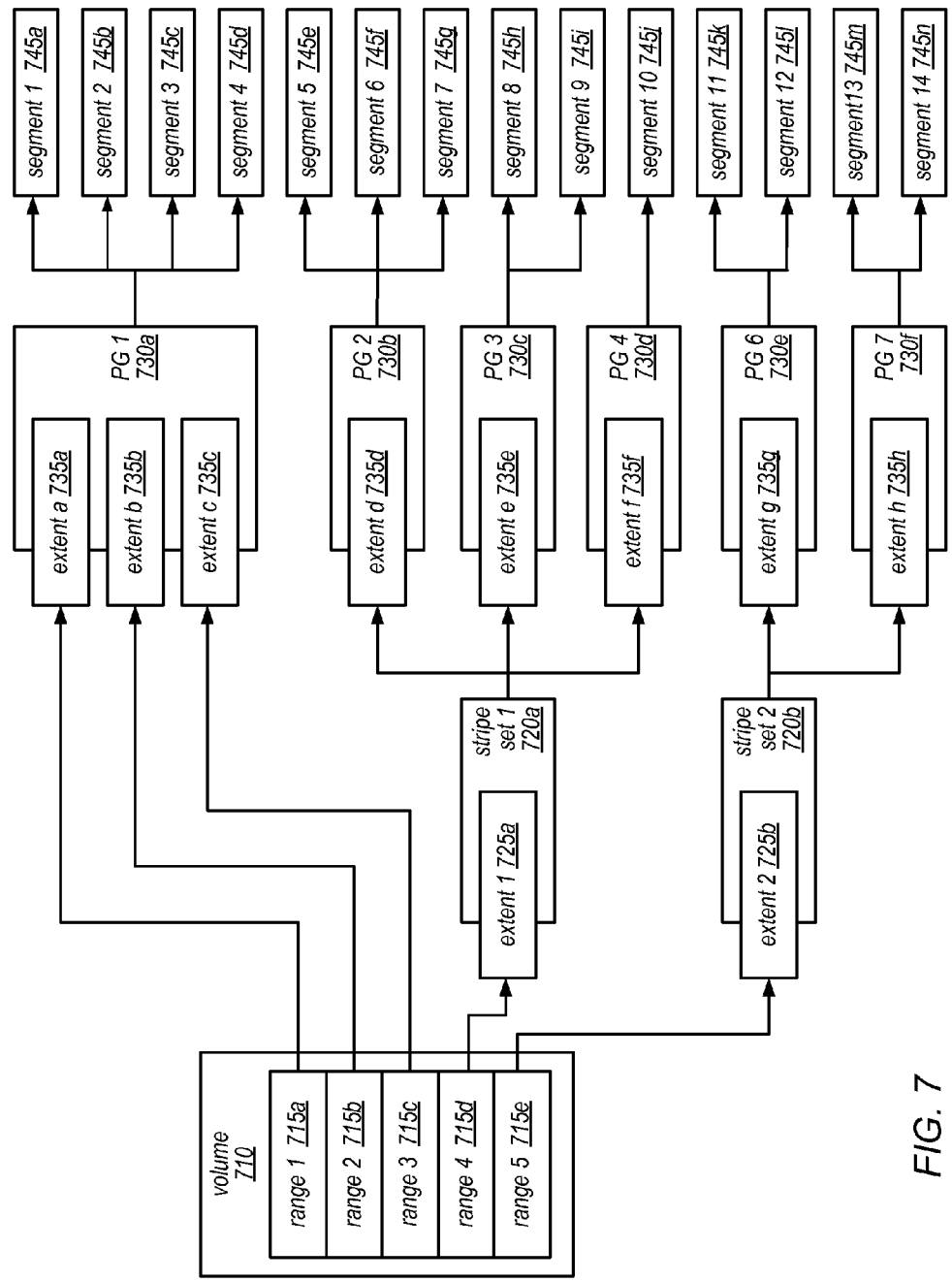
FIG. 7 is a block diagram illustrating an example configuration of a database volume, according to one embodiment.

FIG. 7 is a block diagram illustrating an example configuration of a database volume 710, according to one embodiment. In this example, data corresponding to each of various address ranges 715 (shown as address ranges 715a-715e) is stored as different segments 745 (shown as segments 745a-745n). More specifically, data corresponding to each of various address ranges 715 may be organized into different extents (shown as extents 725a-725b, and extents 735a-735h), and various ones of these extents may be included in different protection groups 730 (shown as 730a-730f), with or without striping (such as that shown as stripe set 720a and stripe set 720b). In this example, protection group 1 illustrates the use of erasure coding. In this example, protection groups 2 and 3 and protection groups 6 and 7 represent mirrored data sets of each other, while protection group 4 represents a single-instance (non-redundant) data set. In this example, protection group 8 represents a multi-tier protection group that combines other protection groups (e.g., this may represent a multi-region protection group). In this example, stripe set 1 (720a) and stripe set 2 (720b) illustrates how extents (e.g., extents 725a and 725b) may be striped into a volume, in some embodiments.

More specifically, in this example, protection group 1 (730a) includes extents a-c (735a-735c), which include data from ranges 1-3 (715a-715c), respectively, and these extents are mapped to segments 1-4 (745a-745d). Protection group 2 (730b) includes extent d (735d), which includes data striped from range 4 (715d), and this extent is mapped to segments 5-7 (745e-745g). Similarly, protection group 3 (730c) includes extent e (735e), which includes data striped from range 4 (715d), and is mapped to segments 8-9 (745h-745i); and protection group 4 (730d) includes extent f (735f), which includes data striped from range 4 (715d), and is mapped to segment 10 (745j). In this example, protection group 6 (730e) includes extent g (735g), which includes data striped from range 5 (715e), and is mapped to segments 11-12 (745k-745l); and protection group 7 (730f) includes extent h (735h), which also includes data striped from range 5 (715e), and is mapped to segments 13-14 (745m-745n).

Figure 8:
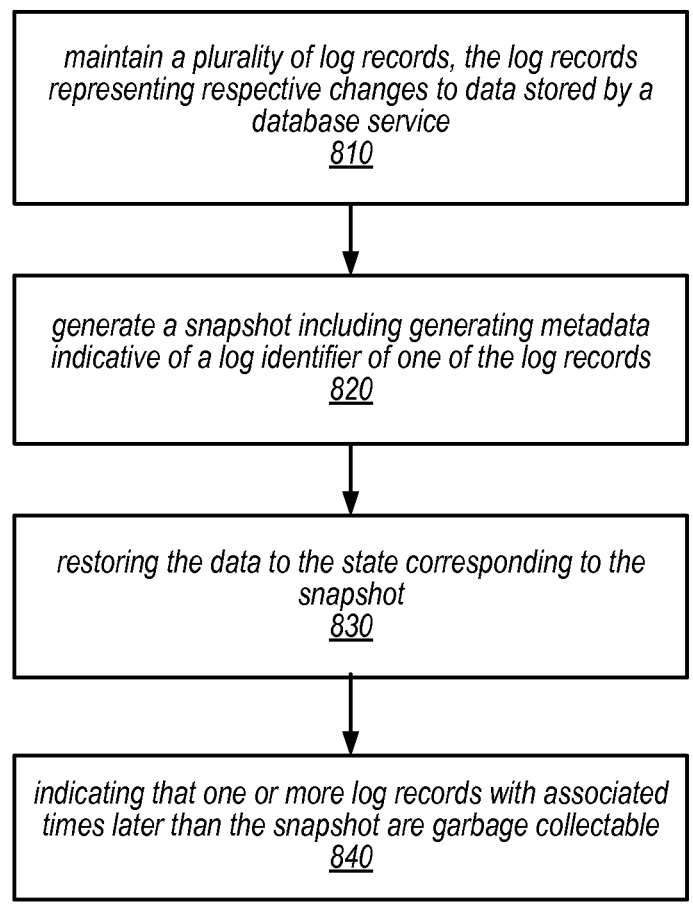
FIG. 8 is a flow diagram illustrating one embodiment of a method for creating and/or using a snapshot in a web services-based database service.

Turning now to FIG. 8, in various embodiments, database system 400 may be configured to create, delete, modify, and/or otherwise use a snapshot. While the method of FIG. 8 may be described as being performed by various components of a log-structured storage system, such as distributed database-optimized storage system 410 (e.g. storage system server node(s) 430, 440, 450, etc.), the method need not be performed by any specific component in some cases. For instance, in some cases, the method of FIG. 8 may be performed by some other component or computer system, according to some embodiments. Or, in some cases, components of database system 400 may be combined or exist in a different manner than that shown in the example of FIG. 4. In various embodiments, the method of FIG. 8 may be performed by one or more computers of a distributed database-optimized storage system, one of which is shown as the computer system of FIG. 10. The method of FIG. 8 is shown as one example implementation of a method for snapshot creation, deletion, modification, use, etc. In other implementations, the method of FIG. 8 may include additional or fewer blocks than are shown.

At 810, a plurality of log records, each associated with a respective change to data stored/maintained by a database service, may be maintained. In various embodiments, the changes, represented by log records, may be stored by storage system service node 430 of a distributed database-optimized storage system of a database service. As described herein, in one embodiment, the log records may be received, by distributed database-optimized storage system, from a database engine head node of the database service. In other embodiments, the log records may be received from another component of the database service that is separate from the distributed database-optimized storage system In one embodiment, each log record may be associated with a respective identifier, such as a sequentially ordered identifier (e.g. a log sequence number ("LSN")), as described herein. The log records may be associated with a respective LSN at the time they are received or the storage system may assign an LSN to a given log record in the order in which it was received.

The data to which the plurality of log records corresponds may be a single data page (e.g., of data page(s) 433, 443, or 453 of FIG. 4) or a number of data pages. Consider a scenario in which the plurality of log records includes four log records having LSNs 1-4. In one example, each of LSNs 1-4 may pertain to a data page A. Or, in another example, LSNs 1 and 3 may pertain to data page A and LSNs 2 and 4 may pertain to data page B. Note that, in the examples, each particular log record may be associated with a single user/data page (e.g., LSN1-page A, LSN2-page B, etc.).

Note that in various embodiments, the log records may be stored in a distributed manner across the various nodes, such as storage system server nodes 430, 440, and 450 of FIG. 4. In some embodiments, a single copy of the log record may be stored at a single node, or a single copy may be stored at multiple nodes, among other examples. Continuing the four log record example from above, the log record with LSN 1 may be stored at both of nodes 430 and 440, LSN 2 may be stored at node 430, and LSNs 3 and 4 may be stored at all three nodes 430, 440, and 450. In such an example, not all of the various nodes and/or mirrors may be up to date with a full set of log records. As described at FIG. 9, log record manipulation may be performed to facilitate reconciling differences between log records stored at the various nodes.

In some embodiments, where a given log record is stored (e.g., which node or nodes) may be determined by the database engine head node and may be included as routing information provided to the distributed database-optimized storage system. Alternatively or in addition to, distributed database-optimized storage system may determine which node or nodes to store a given log record. In one embodiment, such a determination by the distributed database-optimized storage system may be to maximize performance by approximately proportionately distributing the log records among the various nodes. In one embodiment, such a determination by the distributed database-optimized storage system may depend on an importance of a log record. For example, an AULR of an important (e.g., frequently accessed) data page may be stored at multiple nodes whereas a DULR associated with a less important data page may only be stored at a single node.

As described herein, log records may include DULRs and AULRs. In various embodiments, an application, the database service, and/or a user of the database service (or other component) may determine whether to create a DULR or AULR for a given change to a data page. For example, the database service may ensure that at least one of every ten log records for a given data page is an AULR. In such an example, if nine log records in a row for a given data page are DULRs, then the database service may specify that the next log record be an AULR.

Further, in various embodiments, each data page in a volume may need an AULR. Therefore, for the first write of a data page, the log record may be an AULR. In one embodiment, as part of a system initiation, each data page may be written to a certain value (e.g., all zeroes) to initialize the data pages as an AULR. An all zeros AULR may suffice such that subsequent writes of the data page may be DULRs.

As shown at 820, a snapshot may be generated. In various embodiments, generating the snapshot may include generating metadata indicative of a log identifier (e.g., LSN) of a particular log record. In some examples, metadata indicative of one or more other log identifiers of other particular log records may also be generated. Such metadata indicative of log identifier(s) of log record(s) may indicate that those particular log records are to be kept (e.g., not deleted or garbage collected) for that snapshot (until that snapshot is deleted or replaced).

In some embodiments, the generated metadata may also be indicative of a snapshot identifier. Example snapshot identifiers may include one or more of a sequential number, a name, a time associated with the snapshot. For example, a particular snapshot may be called SN1 and/or may have a timestamp of Dec. 22, 2005 at 14:00.00 (2 pm exactly) GMT.

In various embodiments, the metadata associated with the snapshot may be usable to prevent one or more log records from being garbage collected. For example, the metadata may indicate one or more log records that are needed to recreate a given page up to the log record/LSN associated with the snapshot. As a result, the metadata may ensure that the data page(s) can be generated up to the LSN associated with the snapshot.

In various embodiments, the metadata may be stored in a variety of different locations. For example, the metadata may be stored within each log record and may indicate that respective log record's protection from garbage collection status. For example, if log records having LSNs 2, 3, and 4 should not be garbage collected for a particular snapshot, then metadata associated with the log records at LSNs 2, 3, and 4, should indicate that the log records at LSNs 2, 3, and 4 should not be garbage collected. As another example, the snapshot metadata may be stored at a higher level of the distributed database-optimized storage system (e.g., at the segment, volume, or log record level, or elsewhere, etc.) and may indicate the status of a plurality of log records' garbage collection status. In such an example, the metadata include a list of LSNs corresponding to log records that should be retained per the snapshot. Note that upon taking a subsequent snapshot, the log record(s) to be retained may change. As a result, the metadata corresponding to particular ones of the log records may also change. For instance, LSNs 2, 3, and 4 may no longer need to be retained for a future snapshot. Accordingly, in such an example, the metadata may be modified such that it no longer indicates that the log records corresponding to LSNs 2, 3, and 4 should be retained.

In one embodiment, the metadata may explicitly indicate which log records are not garbage collectable or it may instead indicate a snapshot type (described below) along with a particular LSN corresponding to the snapshot. In such an embodiment, a garbage collection process of the distributed database-optimized storage system may determine, from the snapshot type and the particular LSN, which log records are garbage collectable and which are not. For example, the garbage collection process may determine that the log record associated with the particular LSN and each DULR back in time until the previous AULR for that data page are not garbage collectable.

In various embodiments, a snapshot may be specific to a particular data page, or it may be specific to multiple data pages (e.g., segment, volume).

In one embodiment, the metadata may indicate a type of the snapshot (e.g., whether the snapshot is a continuous or a discrete snapshot), as described herein. The type of the snapshot may be directly indicated (e.g., continuous or discrete) in the metadata or it may indirectly indicated (e.g., which log record(s) are indicated as not garbage collectable may be indicative of whether the snapshot is continuous or discrete). For example, a continuous snapshot may indicate one set of log record(s) that are not garbage collectable whereas a discrete snapshot may indicate a different (e.g., smaller) set of log record(s) that are not garbage collectable. In some situations, a continuous and discrete snapshot may have metadata indicating the same set of log record(s). For example, for a snapshot of a data page taken at a point in time corresponding to an AULR, the continuous and discrete snapshot may both have metadata that indicates only the AULR should be protected from garbage collection.

A continuous snapshot may be usable to restore the data to each point in time between the time of the continuous snapshot and a previous time (e.g., the most recent AULR). In contrast, a discrete snapshot may be reusable to restore data to the state as of the snapshot's point in time. For example, consider an example of a data page (AULR), with three delta log records after that data page, followed by a new version of the data page (AULR) and three more delta log records for that new version of the data page. Using a snapshot to restore data is used herein to describe reading the data as of the snapshot without making a copy of the previous version of the data. If a discrete snapshot is taken at the point in time after all of the entries (both AULRs and all six DULRs), then the log entries that may be indicated as not garbage collectable include the new version of the data page and the three log entries after that data page. If a continuous snapshot is taken from the current snapshot point in time to the point in time of the first version of the data page, then the log entries that may be indicated as not garbage collectable include the first data page and all six log records. Note that the intermediate instantiated block (e.g., the new version of the data page (AULR)) may not be indicated as not garbage collectable because it is recreatable with the first version of the data page and the first three log records. Note that, in this example, the continuous snapshot is usable to restore the data page to any of the points in time for which log records exist whereas the discrete snapshot is usable to restore the data page to the point in time of the snapshot and to each point in time between the point in time of the snapshot and the most recent AULRs before the snapshot.

In some embodiments, generating the snapshot may be performed without additional reading, copying, or writing the data block, as would be required when employing an off-volume backup strategy. Accordingly, the snapshot may be generated in place such that the snapshot generation may not requiring take a backup of the data. Note that backups of data where the data is also stored elsewhere may occur but such occurrence may be performed outside of the snapshot generation process. For instance, a client may request that multiple copies of the data be stored in separate storage locations.

As illustrated at 830, the data may be restored to the state corresponding to the snapshot. For example, if a user dropped a table but wants that table back, the snapshot can be used to read/restore the data (e.g., data page, segment, volume, etc.) such that the table is available again. Note that reading/restoring the snapshot may include losing some data/work that was performed after the point of the snapshot and may not include creating a copy of the previous version of the data as part of the read/restore process.

Restoring the data to the state corresponding to the snapshot may include applying one or more of the log records, including the particular log record indicated in the metadata, to a previous version of the data. The previous version of the data may be in the form of an AULR or it may be in the form of a DULR (as applied to an AULR and/or one or more DULRs before the DULR).

In some embodiments, applying the one or more log records to a previous version of the data may be performed as a background process for the database service. In one embodiment, applying the log record(s) to the previous version of the data may be distributed across various nodes of the database service. In one embodiment, applying the log record(s) to the previous version of the data may be performed in parallel across those various nodes.

As shown at 840, after restoring to a particular snapshot, one or more log records with associated times later than a time associated with the snapshot may be indicated as garbage collectable. For example, if log records having LSNs 1-6 exist for a data page with a snapshot having been taken at LSN 3, upon restoring the snapshot taken at LSN 3, LSNs 4-6 may be indicated as garbage collectable or may simply have the not garbage collectable indication removed (thereby making them garbage collectable). Thus, even if a second snapshot was taken at LSN 6, upon restoring the snapshot from LSN 3, the snapshot taken at LSN 6 may no longer be in place such that the protection of log records corresponding to snapshot taken at LSN 6 may no longer be in effect. Or, in one embodiment, the second snapshot may still be preserved even when restoring to a previous snapshot.

In various embodiments, garbage collection may be a background process that permits space used to store log records to be reclaimed for other log records in the future (or for other data). Garbage collection may be spread across the various nodes such that garbage collection may occur as a distributed process in parallel. Reclaiming by the garbage collection process may include deleting one or more log records. Those log records to delete may be determined by the garbage collection process based on the particular log record(s) indicated in the metadata and/or may be based on the type of snapshot. Or, in one embodiment, in which each protected log record is explicitly indicated in metadata, then the garbage collection process may simply delete log records not indicated as protected in the metadata.

In some embodiments, a plurality of the log records may be coalesced based, least in part, on the snapshot. For example, for a given data page, if an AULR exists at LSN 1, DULRs exist at LSNs 2-8 and a discrete snapshot is taken at LSN 8, a new AULR may be created to replace the DULR at LSN 8 such that each of the log records from LSN 2-8 are applied to the AULR at LSN 1. The new AULR at LSN 8 may then allow the log records at LSN 1-7 to be garbage collectable thereby freeing up the space used to store those log records. Note that for a continuous snapshot, coalescing may not take place to maintain the ability to restore to each of the points in time covered by the continuous snapshot. Note that a client may request that continuous snapshots be retained for the two previous days and periodic (e.g., twice daily, once daily) discrete snapshots be retained for the thirty days before that. When a continuous snapshot falls outside of the previous two day range, it may be converted into a discrete snapshot, and the log records no longer needed for the converted discrete snapshot may no longer be retained.

Consider an example in which a once daily discrete snapshot exists for each of days 1-30 and continuous snapshots exist from day 30 to day 32. On day 33, the continuous snapshot from day 30 to day 31 may no longer be needed by a client as it is no longer in the most recent two day period. Accordingly, the continuous snapshot from day 30 to day 31 may be converted into a discrete snapshot. To convert the portion of the continuous snapshot from day 30 to day 31 into a discrete snapshot, the metadata may be modified such that log record(s) no longer needed for the discrete snapshot at that point in time may be indicated as garbage collectable (or no longer indicated as not garbage collectable). Along the same lines, the discrete snapshot at day 1 may be deleted and/or garbage collected as well (assuming the day 2 discrete snapshot is not dependent on the log records of the discrete snapshot at day 1) because it no longer falls within the preceding thirty day window before the most recent two days. Deleting the snapshot at day 1 may include modifying and/or deleting the metadata that protected the log records associated with the day 1 snapshot from being garbage collected (unless needed by a subsequent snapshot) such that those records may then be garbage collectable. Note that if the discrete snapshot at day 2 includes is dependent on log records of the discrete snapshot at day 1, one or more log records associated with the discrete snapshot at day 2 may be converted in AULR(s) such that the day 1 log records can be deleted and/or garbage collected.

As described herein, the method of FIG. 8 may apply to data of a single data page or to data from multiple data pages. Therefore, in various embodiments, the snapshot may be usable to restore data from multiple different data pages or to a single data page. Accordingly, the metadata of the snapshot may be indicative of one or more log identifiers for one or more particular log records for a single data page or multiple log identifiers for multiple log records for multiple data pages. Further note that metadata corresponding to a snapshot for a single data page may, in some instances, also be indicative of multiple log identifiers for multiple log records. For example, the metadata may be indicative of multiple log records that should not be garbage collected, such as if the snapshot corresponds to a DULR. In such an example, the metadata may be indicative (directly or indirectly) that each DULR back in time to the most recent AULR and the most recent AULR for that page should not be garbage collected.

The disclosed in-place snapshot techniques may improve performance of the system in terms of using fewer IO and networking resources as opposed to a system that backs up the data to perform a snapshot by reading, copying, and writing of the data block. And because of those performance improvements, the disclosed techniques may provide for fewer transaction rate stalls or throttling that would be visible to users of the system (e.g., those using the system for foreground activity).

Figure 9:
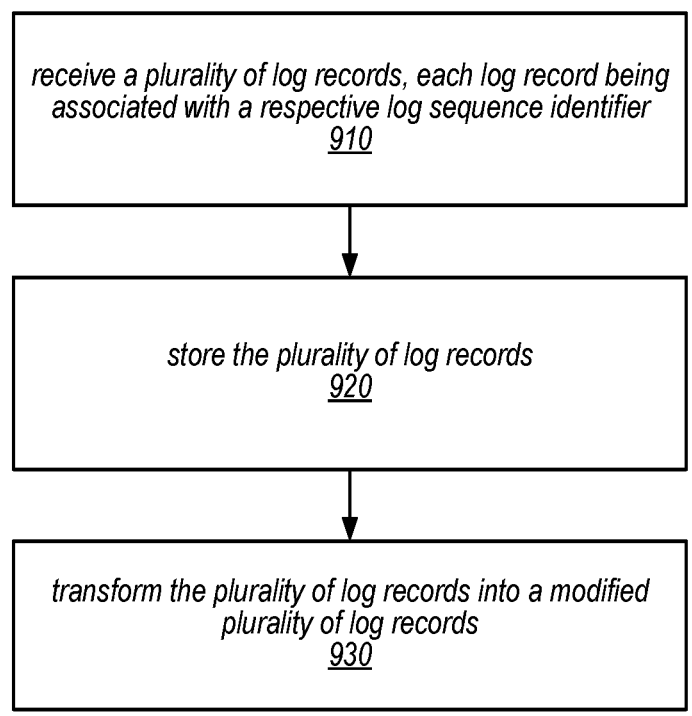
FIG. 9 is a flow diagram illustrating one embodiment of a method for manipulating log records in a web services-based database service.

Turning now to FIG. 9, in various embodiments, data base system 400 may be configured to manipulate (e.g., transform, modify, etc.) log records. While the method of FIG. 9 may be described as being performed by various components of a log-structured storage system, such as distributed database-optimized storage system 410 (e.g. storage system server node(s) 430, 440, 450, etc.), the method need not be performed by any specific component in some cases. For instance, in some cases, the method of FIG. 9 may be performed by some other component or computer system, according to some embodiments. Or, in some cases, components of database system 400 may be combined or exist in a different manner than that shown in the example of FIG. 4. In various embodiments, the method of FIG. 9 may be performed by one or more computers of a distributed database-optimized storage system, one of which is shown as the computer system of FIG. 10. The method of FIG. 9 is shown as one example implementation of a method for log transformation/manipulation. In other implementations, the method of FIG. 9 may include additional or fewer blocks than are shown. For example, the method of FIG. 9 may be used in conjunction with the method of FIG. 8 such that the method of FIG. 9 includes one or more blocks of the method of FIG. 8.

At 910, a plurality of log records may be received. For example, the log records may be received by the distributed database-optimized storage system, from a database engine head node of the database service. As noted at FIG. 8, and as described herein, each log record may be associated with a respective log sequence identifier and may be associated with a respective change to data stored by the database system. Also as described herein, log records may include one or more AULRs, also referred to as baseline log record(s), and/or one or more DULRs. The baseline log record(s) may include a page of data, such that it includes the full data for the page and not just changes to the data. In contrast, DULRs may include a change to a page of data and not the full page of data.

The following paragraphs describe an example notation to describe a range of log records. Simple brackets ( ) and square brackets [ ] indicate open (exclusive) and closed (inclusive) bounds in a range. As described herein, LSNs may be a sequential ordering of log records, such that $0<=a<=b<=c<=d<=e$. LSN t is a special LSN that stands for tail, which starts from 0 and is continually increasing as writes occur on the volume. As used herein, a log section is a collection of log records that has all the information necessary to be able to read a volume at one or more target LSNs, given a volume at a baseline LSN. In one embodiment, the log section does not contain any log record with LSN less than or equal to the baseline LSN or greater than the highest target LSN. For example, if there is a complete volume at a baseline LSN of 'a', and a log section is L(a;b], then the volume can be generated and read at LSN 'b'.

Using an example syntax, a log section may then be represented as L(<baseline LSN>;<set of target LSNs>]. In one embodiment, <baseline LSN> may be a single LSN (e.g., '0' or 'a'). <set of target LSNs> may be a single LSN (e.g., 'b'), a sequence of discrete LSNs (e.g., 'b,c'), an inclusive range of LSNs (e.g., 'c . . . d'), or a combination thereof (e.g., 'b,c,d . . . e'). An inclusive range, such as c . . . d indicates that enough information is available to restore any volume between c and d. According to the example syntax, target LSNs are greater than or equal to the baseline LSN. Further according to the example syntax, LSNs of a log section are listed in ascending order.

In various embodiments, records in a log section can be a combination of AULRs and/or DULRs. A log section may alternatively include only DULRs or only AULRs. For example, a log section may include only AULRs for user pages that were modified between the baseline and target LSNs. In various embodiments, it is not required to be able to generate versions of user pages at LSNs other than the target LSNs. For example, a log section L(a;c] may not have enough information to generate user pages at LSN b where a<b<c.

Assuming that the initial state of a volume consists of all zeros, a log section of the form L(0;a] may represent the volume at LSN a.

The log section notation described herein is indicative of LSNs for a volume that includes multiple data/user pages. For example, consider a volume that includes only two pages, x and y. A log record with LSN 1 may be an AULR for page x and a log record with LSN 2 may be an AULR for page y. Continuing the example, log records with LSNs 3 and 5 may be DULRs for page x and log records with LSNs 4 and 6 may be DULRs for page y. If a read request comes in for page y, then the database service may start with the AULR at LSN 2, which is the most recent AULR for page y, and apply the changes from LSNs 4 and 6 on top of that. Similarly, for a read request for page x, the database service would start with the AULR at LSN 1 and then apply the changes from the log records at LSNs 3 and 5 before returning page x to the requestor.

As shown at 920, the plurality of log records may be stored among the storage nodes of the distributed database-optimized storage system. In one embodiment, a given log record may be stored at one or more storage nodes of the distributed database-optimized storage system. In one embodiment, the distributed database-optimized storage system may determine which one or more storages nodes on which to store the given log record, or the distributed database-optimized storage system may receive instructions from the database engine head node that indicates one or more storage nodes on which to store the given log record. Note that in some instances, because each storage node may not store the same one or more log records at a given time, one or more nodes and/or mirrors of the storage system may not be up to date with a complete set of the current log records.

As illustrated at 930, the plurality of log records may be transformed. As indicated in the example notation described herein, the plurality of log records that may be transformed may include two or more log sections. Those two or more log sections may be operands for the transformation. Various examples of log sections as operands (e.g., L(a;c], L(a;b,d], L(a;b,c . . . e], etc.) are provided below. Transformation may occur in a variety of manners. For example, in one embodiment, transforming the plurality of log records may result in a modified plurality of log records. The modified plurality of log records may be a different plurality of log records. The different plurality of log records may be fewer in number than the originally maintained plurality of log records, greater in number, or equal in number but different in at least one of the log records. Transformation of the log records may result in a more efficient system (e.g., in terms of storage space, network usage, etc.)

In one embodiment, in a distributed system with a plurality of nodes and mirrors, some of the nodes and/or mirrors may be up to date, and some may not be. In such an embodiment, transforming the plurality of log records may include determining that differences exist in log records maintained at different ones of the storage nodes and reconciling those differences in log records maintained at the various nodes. Reconciling the differences in log records may include generating and/or reconstructing a modified plurality of log records in the form of an overall master log of log records that reconciles the various log records stored at the various nodes. In one embodiment, the master log may be then be provided to the various nodes and/or mirrors to synchronize the contents of the logs (e.g., by replacing a log that is not up to date). Or, in one embodiment, the master log may be maintained on a particular node. That master log may be deemed as the master log of the storage nodes until the next occurrence of log reconciliation.

To illustrate log reconciliation, consider a simple example with three storage nodes, SN1, SN2, and SN3. SN1 may store log records having identifiers LSN 1, LSN 2, and LSN 3. SN2 may store log records having identifiers LSN 3, LSN 4, and LSN 5, and SN3 may store log record having identifier LSN 6. Transforming the log records may include generating a master log record that includes once instance of LSNs 1-6 and not two instances of LSN 3, which was stored at both SN1 and SN2. Performing the log reconciliation may include applying one or more log operations to the log records. Example log operations include coalescing, pruning, cropping, reducing, fusing, and/or otherwise deleting or adding log records. Such example log operations are described in more detail below.

As described herein, in one embodiment, transforming the log records may include coalescing the plurality of log records. Coalescing the log records may include converting a delta log record into a new baseline log record. Consider an example for data pages x and y in which LSNs 1, 2, 15, and 16 are identifiers of respective AULRs and LSNs 2-14 are identifiers of respective DULRs. Coalescing the log records may include converting the DULR of LSN 8 to an AULR. To convert LSN 8 to an AULR, the changes from log records that correspond to the same data page as LSN 8 (e.g., data page y), including the log record at LSN 8, may be applied to the most recent AULR for that data page. For example, if LSN 2 corresponds to an AULR for data page y and LSNs 4, 6, and 8 correspond to DULRs for data page y, then converting the DULR at LSN 8 to an AULR includes applying the changes of the log records at LSNs 4, 6, and 8 to the AULR at LSN 2. As described herein, in certain situations, the log records at LSN 2, 4, and 6 may then be garbage collected or otherwise deleted, whereas in other situations (e.g., for a continuous snapshot or other dependency), those LSNs may be retained until no longer needed.

In various embodiments, the plurality of log records may be associated with at least one snapshot (e.g., a snapshot as created according to the method of FIG. 8) that is usable to restore data to a previous state. In such embodiments, transforming the plurality of records may include garbage collecting one or more of the log records, based at least in part, on the snapshot. For instance, continuing the previous coalescing example, if LSNs 2, 4, and 6 are needed as part of a continuous snapshot, then the log records corresponding to those LSNs may not be garbage collectable (and may not be coalesced in the first place). In contrast, if those log records are not needed as part of a snapshot, then they may be garbage collected. For example, if a discrete snapshot exists at an LSN after LSNs 2, 4, and 6, for example, at LSN 10, then the log records at LSNs 2, 4, and 6 may not be needed because the log record at LSN 8 is an AULR. Therefore, the log records at LSNs 2, 4, and 6 may be garbage collected.

As described herein, transforming the log records may include indicating that one or more log records are garbage collectable. In such an example, transforming the log records to indicate one or more log records are garbage collectable may include generating and/or modifying metadata associated with those one or more log records to indicate those log records are garbage collectable.

In one embodiment, transforming the log records may include deleting one or more log records. As described herein, deleting a log record may be part of a prune or crop operation, among other operations. Deleting the log record may be different that garbage collection, in some embodiments, in that garbage collection may be passively and lazily performed as a background process, whereas deletion may be performed as a foreground process.

In one embodiment, transforming the log records may include performing a crop operation to crop the plurality of log records. Performing the crop operation may include deleting (and/or indicating as garbage collectable) one or more log records having respective identifiers (e.g., LSN value) less than or less than or equal to the value of a target identifier (e.g., target LSN). The crop operation may be used to increase the baseline LSN of a log section. Note that the respective identifiers may be sequentially ordered according to time, therefore, in some embodiments, cropping may include deleting the log records having respective associated times before an associated time of the target identifier.

In one embodiment, the left argument for the operation may be a log section with baseline LSN B1 and the right argument may be a range of LSNs to be removed. Accordingly, the result may be one or more log records having LSNs that start at a point in time corresponding to the target LSN. As one example, consider the following example crop operation, with '−' denoting crop, L(a;c]−(a,b]=L(b;c]. Thus, the portion (a,b] is cropped from (a;c] resulting in a new range of (b;c]. As noted above, simple ( ) brackets may indicate open bounds in a range and square [ ] brackets may indicate closed bounds in a range. As another crop example, consider the crop operation L(a;b,d]−(a,c]. The result is L(c;d]. As yet another crop example, consider the crop operation where L(a;b,c . . . e]−(a,d]=L(d;e].

As a result of the crop operation, one or more log records having an LSN less than or equal to the new baseline LSN may be deleted (or garbage collected). In some examples, it is possible that the original log section may not include any such log records to crop. In those examples, the crop operation may not result in a reduction in the size of the log section.

In one embodiment, transforming the log records may include performing a prune operation to prune the plurality of log records. Performing the prune operation may include deleting (and/or indicating as garbage collectable) one or more log records having respective identifiers (e.g., LSN value) greater than or greater than or equal to the value of a target identifier (e.g., target LSN). The prune operation may be used to remove a trailing portion of a log section. Similar to the crop operation, because respective identifiers may be sequentially ordered according to time, in some embodiments, pruning may include deleting the log records having respective associated times after an associated time of the target identifier.

In one embodiment, the left argument for the prune operation may be a log section with target LSN(s) T1 and the right argument may be a new target LSN(s) T2, with T2 being a proper subset of T1. The prune operation may remove LSNs such that the removed LSNs are greater than the retained LSNs. For example, for LSNs L3 in {T1−T2} with L2 in T2, the following condition may hold true: L3>L2.

As one example, consider the following example prune operation, with '@' denoting crop, L(a;b,c]@[b]=L(a;b]. Thus, the portion of log records with respective identifiers greater than the target identifier b is deleted from the log section L(a;b,c]. Another example includes L(a;b . . . d]@[b . . . c]=L(a;b . . . c]. As was the case with the crop operation, the prune operation, the original log section may not include any such log records to prune. In those examples, the prune operation may not result in a reduction in the size of the log section.

In one embodiment, transforming the log records may include reducing the plurality of log records. The reduce operation may reduce the set of target LSNs of a log section without changing the highest target LSN. Accordingly, the reduce operation may be a complementary operation to the prune operation. Reducing may not cut the head or tail end of a log section but instead may remove a middle portion of the section. An example of a reduce operation would be to remove the continuous portion of a snapshot. For instance, if a continuous snapshot is requested for the last two days and discrete snapshots requested for the last 30 days, once a portion of the continuous snapshot is greater than two days old, a portion may be removed thereby resulting in one or more discrete snapshots.

The reduce operation may be denoted by '@@'. The left argument to the reduce operation may be a log section with target LSN T1 with the right argument being the next target LSN T2, with T2 being a proper subset of T1. The highest LSN in T1 may be equal to the highest LSN in T2. As an example, L(a;b . . . c]@@[c] may result in L(a;c]. As another example, L(a;a . . . b,c . . . e]@@[b,d . . . e] may result in L(a;b,d . . . e]. Note that no log records may be required to be deleted as part of the reduce operation. In some examples, some log records may not be required to generate user page versions at the new target LSNs. Those log records may be deleted safely but are not required to be deleted. Those log records can be left in place and/or garbage collected lazily. Identifying which log records are deletable (e.g., via deletion or garbage collection) may be determined based on determined dependencies among the plurality of log records. For example, certain DULRs may be dependent on one or more previous DULRs and/or a previous AULR. Therefore, in one embodiment, a log record that is deletable and does not have other log records dependent upon it may be deleted and/or garbage collectable whereas a log record that would otherwise be deletable but has other log records dependent on it may be kept and not deleted or garbage collected.

Note that in some embodiments, while it is possible to increase the baseline LSN in a flexible way (e.g., using the crop operation), a similar decrease in target LSN may not be available. For example, while L(a;c] may be transformed into L(b;c], in some embodiments, it may not be transformed into L(a;b] because L(a;c] may be missing some log record(s) between a and b, which were superseded by AULR(s) between b and c. Thus, L(a;c] may lack enough information to generate the whole volume at LSN b. The new target LSN set of a log section may have to be a subset of the previous target LSN set. For example, L(a;b . . . c] and L(a;a . . . c] may not have the necessary information to generate the whole volume at LSN b but can be transformed into L(a;b] using prune and reduce operations.

In one embodiment, transforming the log records may include combining the plurality of log records with another plurality of log records in a fuse operation. For example, the fuse operation may include combining two adjacent log sections into a single log section such that the target LSNs of both log sections are retained. The fusion operation may be represented by '+'. The left argument may include a log section with a lower baseline LSN B1 with the highest target LSN being T1. The right argument may include a log section with a higher baseline LSN B2. B2 is equal to T1 in some embodiments. One example fuse operation is L(a;b]+L(b;c] =L(a;b,c]. Another example fuse operation is L(a;b,c]+L(c; d,e]=L(a;b,c,d,e]. In various embodiments, no log records may be deleted as part of a fuse operation.

In one embodiment, if garbage collection is performed without retaining any snapshots, the log can be represented by L(0;t]. If no garbage collection is performed, the log can be represented by L(0;0 . . . t].

A notation for representing a volume at LSN 'a' may be V[a]. V[0] can be assumed to include all zeroes. In one embodiment, transforming the log records of a volume may include a constitute operation, represented by '*'. A new volume may be created as a higher LSN given a volume at a lower LSN and a log section corresponding to the LSN gap. The left argument may be a volume at LSN B and the right argument may be a log section with baseline LSN B and a single target LSN T. A log section with multiple target LSNs may be pruned and/or reduced to the single LSN of interest before constituting the desired volume. An example includes V[a]*L(a;b]=V[b].

In one embodiment, transforming the log records may include performing combinations of operations to the plurality of log records. Consider the following derived transformation from a combination of operations: {L(b;c],L(b; d]} L(b;c,d]. Such a transformation may be derived from crop and fuse operations as follows: L(b;d]−(b,c]=L(c;d] and L(b;c]+L(c;d]=L(B;c,d]. Another example derived transformation extends the previous example: {L(a;c],L(b; d]} L(b;c,d], which includes the crop and fuse from the previous example and further includes an additional crop L(a;c]−(a,b]=L(b;c]. Note that the use of '→' represents a generic transformation without showing the details of the operations. For example, {L1,L2}→{L3} is a transformation from L1 and L2 to L3 without showing the underlying operations to perform the transform.

In various embodiments, performing combinations of multiple operations on the plurality of log records may facilitate snapshot operations (e.g., as part of taking, restoring, truncating, and/or deleting a snapshot as in FIG. 8), or log record reconciliation, among other operations. Example combinations for taking, restoring, and deleting discrete and continuous snapshots follow.

For an example of combining operations to take a discrete snapshot, an initial state of a live log for the distributed storage system may be L(0;t]. A snapshot may be taken when the tail reaches LSN a, L(0;a,t]. L(0;a,t] may then be pruned at [a], L(0;a,t]@[a]=L(0;a]. L(0;a] may be copied to a snapshot storage location, which may be a separate storage location than the distributed storage system. Another snapshot may be taken when the tail reaches LSN b, L(0;a,b,t]. L(0;a,b,t] may then be cropped according to L(0;a,b,t]-(0,a], resulting in L(a;b,t). L(a;b,t) may then be pruned at [b] (L(a;b,)@[b]) resulting in L(a;b]. L(a;b] may then be copied to the snapshot storage location as well.

For an example of combining operations to restore a discrete snapshot, consider the following to be available at the snapshot storage location: L(0;a],L(a;b]. L(0;a] and L(a;b] may be copied to the restore destination and may be fused according to L(0;a]+L(a;b]=L(0;a,b]. The fused section may then be reduced according to L(0;a,b]@@[b]=L(0;b]. L(0;b] may be the desired snapshot to restore and may be used to start a new volume.

For an example of combining operations to delete an old discrete snapshot, consider the following initial live log state L(0;a,b,t]. L(a;a,b,t]@@[b,t]=L(0;b,t] may be used to delete a snapshot at a and L(0;a,b,t]@@[t]=L(0;t] may be used to delete both snapshots a and b.

For an example of combining operations to take a continuous snapshot, an initial state of a live log for the distributed storage system may be L(0;t] as was the case in the discrete snapshot taking example. A continuous snapshot make be begun when the tail reaches LSN a, as indicated by L(0;a . . . t]. After the tail crosses LSN b (b<t), L(0;.a . . . t] can be pruned (@@) by [a . . . b] giving L(0;a . . . b]. L(0;a . . . b] may then be copied to the snapshot storage location. After the tail cross LSN c (c<t), L(0;a . . . t]@@[a . . . c]=L(0;a . . . c). L(0;a . . . c)@@[b . . . c]= L(0;b . . . c]. L(0;b . . . c] may then be cropped at (0,a] giving L(b;b . . . c], which may then be copied to the snapshot storage location. The continuous snapshot may be stropped when the tail reaches LSN d: L(0,a . . . d,t].

For an example of combining operations to restore a continuous snapshot, consider the following to be available at the snapshot storage location: L(0;a . . . b], and L(b;b . . . c]. L(0;a . . . b], and L(b;b . . . c] may be copied to a restore destination where the two log sections may be fused together as L(0;a . . . b]+L(b;b . . . c]=L(0;a . . . c]. If restore was requested for an LSN x, where b<x<c, then the following may be performed: L(0;a . . . c] @[a . . . x]= L(0;a . . . x]. The result may then be reduced (@@) at [x] resulting in L(0;x]. The desired snapshot may be L(0;x] and may be used to start a new volume.

Consider the following examples of combining operations to delete a continuous snapshot with initial state of the live log being L(0,a . . . d,t]. L(0,a . . . d,t] may be reduced by [t] to delete the entire continuous snapshot resulting in L(0;t] (log section with no retained snapshots). As another example, L(0,a . . . d,t] may be reduced by [a . . . c,t] to delete a part of the continuous snapshot from c to d resulting in L(0,a . . . c,t]. As another example, L(0,a . . . d,t] may be reduced by [c . . . d,t] to delete a part of the continuous snapshot from a to c resulting in L(0,c . . . d,t].

Consider the following example of truncating a current continuous snapshot with initial state of the live log being L(0,a . . . t], where c<t. L(0,a . . . t]@@[c . . . t]= L(0;c . . . t], which may contain only a recent part of the current continuous snapshot.

In various embodiments, the database service may receive a request, from a user, of time frames, ranges, or windows in which to snapshot and/or may receive an indication of the type of requested snapshot (e.g., continuous or discrete). For example, a user may request that they want continuous snapshots for the previous two days and discrete snapshots for the previous thirty days. The database service may then determine which log record operation(s) (e.g., crop, reduce, prune, etc.) to perform on the log sections to satisfy the user's request. Continuing the example, once a portion of a continuous snapshot is more than two days old, the system may determine that a reduce operation is appropriate to reclaim space (e.g., via garbage collection) for log records that are no longer needed.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein).

Figure 10:
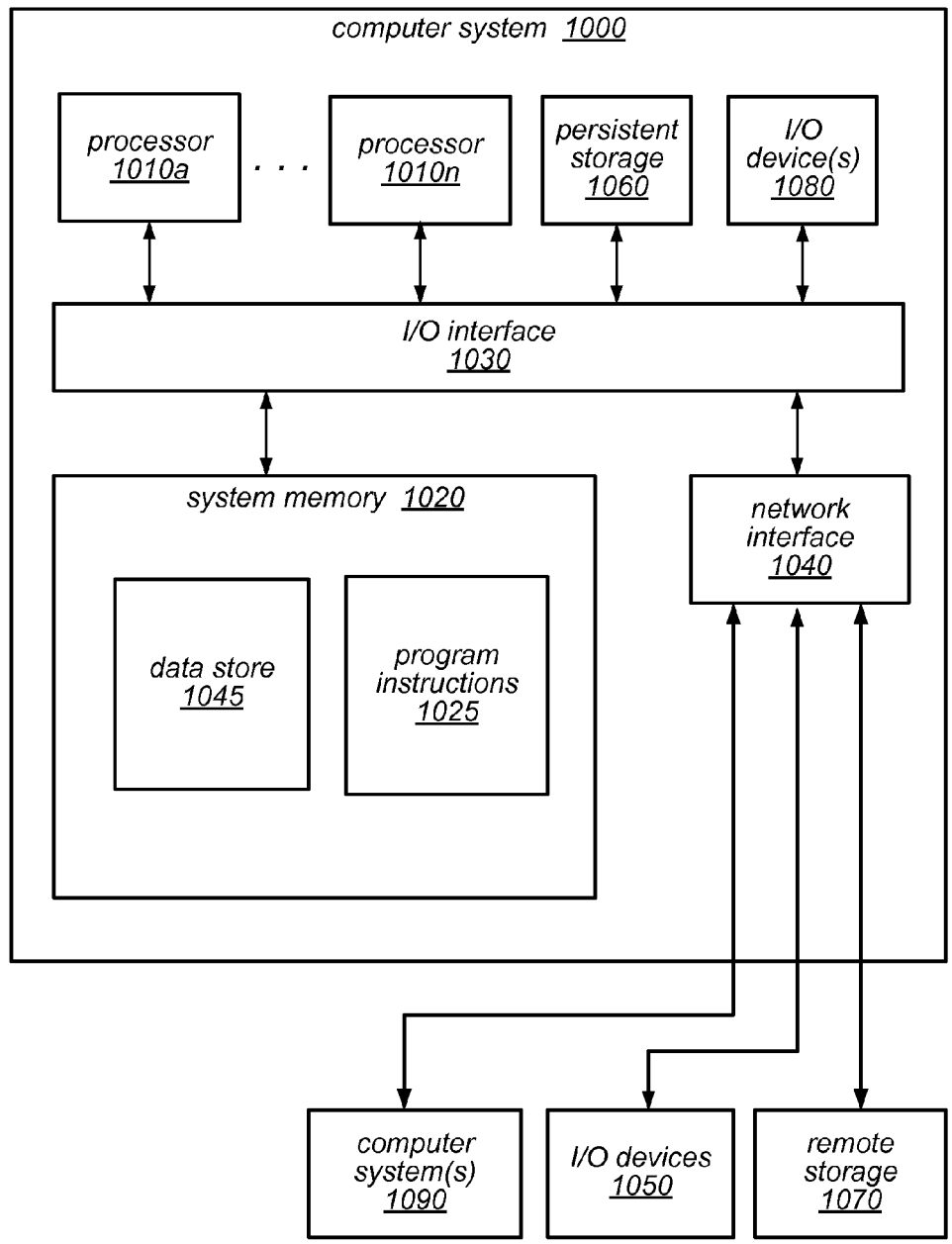
FIG. 10 is a block diagram illustrating a computer system configured to implement at least a portion of a database system that includes a database engine and a separate distributed database storage service, according to various embodiments.

FIG. 10 is a block diagram illustrating a computer system configured to implement at least a portion of the database systems described herein, according to various embodiments. For example, computer system 1000 may be configured to implement a database engine head node of a database tier, or one of a plurality of storage nodes of a separate distributed database-optimized storage system that stores database tables and associated metadata on behalf of clients of the database tier, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a database engine head node of a database tier, or one of a plurality of storage nodes of a separate distributed database-optimized storage system that stores database tables and associated metadata on behalf of clients of the database tier, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the database tier (e.g., on a database engine head node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, coalesced data pages, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

The invention claimed is:

1. A system, comprising:
a plurality of storage nodes, each of which comprises at least one processor and a memory, wherein the plurality of storage nodes is configured to collectively implement a distributed log-structured storage system of a database service configured to:
receive a plurality of log records, from one or more database engine head nodes of the database service, wherein each of the plurality of log records describes a respective change to data stored by the database service as part of a log and is further associated with a respective log sequence identifier;
store the plurality of log records among the plurality of storage nodes; and
perform an operation upon two or more log sections of the log included in the plurality of log records to generate at least one new log section, wherein the two or more log sections describe one or more respective versions of the data maintained by the plurality of log records, wherein the operation transforms the plurality of log records stored among the plurality of storage nodes such that the at least one new log section describes a version of the data maintained as a result of the transformation of the plurality of log records, wherein the two or more log sections are operands for the operation.

2. The system of claim 1, wherein the distributed log-structured storage system is further configured to:

determine that a difference exists between first log records of the plurality of log records stored at a first storage node of the plurality of storage nodes and second log records of the plurality of log records stored at a second storage node of the plurality of nodes;

wherein the operation is performed as part of reconciling the difference between the first log records and the second log records.

3. The system of claim 1, wherein said performing the operation includes determining that one or more log records of the plurality of log records are deletable based, at least in part, on determined dependencies among the plurality of log records.

4. A method, comprising:

performing, by one or more computers of a database service:

maintaining a plurality of log records indicative of data stored by the database service, wherein each log record describes a respective change to the data stored by the database service as part of a log and is associated with a respective log sequence identifier; and performing an operation upon two or more log sections of the log included in the plurality of log records to generate at least one new log section, wherein the two or more log sections describe one or more respective versions of the data maintained by the plurality of log records, wherein the operation transforms the plurality of log records maintained for the database service such that the at least one new log section describes a version of the data maintained as a result of the transformation of the plurality of log records, wherein the two or more log sections are operands for the operation.

5. The method of claim 4, further comprising:

determining that first log records of the plurality of log records stored at a first storage node of the database service are different, in at least one respect, than second log records of the plurality of log records stored at a second storage node of the database service;

wherein the operation is performed as part of reconciling the first and second log records.

6. The method of claim 4, wherein the plurality of log records includes at least one baseline log record, wherein the baseline log record includes a page of the data.

7. The method of claim 4, wherein the plurality of log records include at least one delta log record, wherein the delta log record includes a change to a page of the data.

8. The method of claim 4, wherein the operation includes converting a delta log record of the plurality of log records into a new baseline log record.

9. The method of claim 4, wherein the plurality of log records is associated with at least one snapshot that is usable to restore the data to a previous state, wherein the operation includes garbage collecting one or more of the log records based, at least in part, on the at least one snapshot.

10. The method of claim 4, wherein the operation includes indicating that one or more log records of the plurality of log records are garbage collectable.

11. The method of claim 4, wherein the operation includes deleting one or more log records of the plurality of log records.

12. The method of claim 4, wherein the operation is a crop operation, wherein said performing the crop operation includes deleting one or more log records of the plurality of log records having respective identifiers with values less than a value of a target identifier.

13. The method of claim 4, wherein the operation is a prune operation, wherein said performing the prune operation includes deleting one or more log records of the plurality of log records having respective identifiers with values greater than a value of a target identifier.

14. The method of claim 4, wherein the operation includes determining that one or more log records of the plurality of log records are deletable based, at least in part, on determined dependencies among the plurality of log records.

15. The method of claim 4, wherein the operation includes combining the plurality of log records with another plurality of log records.

16. The method of claim 4, wherein the operation is one of multiple operations performed on the plurality of log records as part of a snapshot operation.

17. A non-transitory computer-readable storage medium storing program instructions, wherein the program instructions are computer-executable to implement a distributed log-structured storage node of a plurality of distributed log-structured storage nodes of a database service, wherein the distributed log-structure storage node is configured to:

store a plurality of log records as part of a log, wherein each of the plurality of log records describes a respective change to data stored by the plurality of a distributed log-structured storage nodes and is further associated with a respective identifier; and perform an operation upon two or more log sections of the log included in the plurality of log records to generate at least one new log section, wherein the two or more log sections describe one or more respective versions of the data maintained by the plurality of log records, wherein the operation transforms the plurality of log records stored at the distributed log-structured storage node such that the at least one new log section describes a version of the data maintained as a result of the transformation of the plurality of log records, wherein the two or more log sections are operands for the operation.

18. The non-transitory computer-readable storage medium of claim 17, wherein the operation includes reconciling a difference between first log records stored at the distributed log-structure storage node and second log records stored at another distributed log-structured storage node of the plurality of distributed log-structured storage nodes.

19. The non-transitory computer-readable storage medium of claim 17, wherein the operation is a crop operation, wherein said performing the crop operation includes deleting one or more log records of the plurality of log records having respective identifiers with values less than a value of a target identifier.

20. The non-transitory computer-readable storage medium of claim 17, wherein the operation includes deleting one or more log records of the plurality of log records having respective identifiers with values greater than a value of a target identifier.

* * * * *